US010783509B2

(12) United States Patent
Pattarawuttiwong

(10) Patent No.: US 10,783,509 B2
(45) Date of Patent: Sep. 22, 2020

(54) MESSAGE SIZING AND SERIALIZATION OPTIMIZATION

(71) Applicant: Square, Inc., San Francisco, CA (US)

(72) Inventor: Shalisa Pattarawuttiwong, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 112 days.

(21) Appl. No.: 15/723,030

(22) Filed: Oct. 2, 2017

(65) Prior Publication Data
US 2019/0102764 A1 Apr. 4, 2019

Related U.S. Application Data

(63) Continuation of application No. 15/721,592, filed on Sep. 29, 2017, now abandoned.

(51) Int. Cl.
*G08G 5/00* (2006.01)
*G06Q 20/20* (2012.01)
*G06Q 20/40* (2012.01)
*G06Q 20/34* (2012.01)
*G06Q 20/08* (2012.01)
(Continued)

(52) U.S. Cl.
CPC ......... *G06Q 20/202* (2013.01); *G06Q 20/085* (2013.01); *G06Q 20/20* (2013.01); *G06Q 20/34* (2013.01); *G06Q 20/405* (2013.01); *G07G 1/0009* (2013.01); *G07G 1/12* (2013.01)

(58) Field of Classification Search
CPC .. G06Q 20/202; G06Q 20/4016; G06Q 20/40; G07F 7/1033
See application file for complete search history.

(56) References Cited

U.S. PATENT DOCUMENTS 5,494,136 A * 2/1996 Humble .................. A47F 9/047
 186/61
7,048,184 B2 * 5/2006 Persky ................... A47F 9/048
 235/383

(Continued)

FOREIGN PATENT DOCUMENTS

GB 2 427 059 A 12/2006
JP 2011-070371 A 4/2003
(Continued)

OTHER PUBLICATIONS

Non-Final Office Action dated Mar. 19, 2019, for U.S. Appl. No. 15/496,529, of Han, K. filed Apr. 25, 2017.
(Continued)

*Primary Examiner* — Talia F Crawley
(74) *Attorney, Agent, or Firm* — Lee & Hayes, P.C.

(57) ABSTRACT

Systems and methods for message sizing and serialization optimization are disclosed. Communications between a secure payment enclave, other components of a customer terminal, a merchant terminal, and/or a remote system may be optimized depending on a state of the customer terminal and/or the merchant terminal. Message sizing and type may be optimized depending on the state. Additionally, or alternatively, message serialization may be optimized using state-dependent protocol buffers. The communications may pass between components of a POS system to a remote system via two operating-system stacks, which may be customized for a POS system transaction.

20 Claims, 11 Drawing Sheets

(51) Int. Cl.
*G07G 1/00* (2006.01)
*G07G 1/12* (2006.01)
*B64C 39/02* (2006.01)
*B64D 45/00* (2006.01)

(56) References Cited

U.S. PATENT DOCUMENTS

| | | | |
|---|---|---|---|
| 9,092,766 B1* | 7/2015 | Bedier | G06Q 20/4016 |
| 9,105,026 B1* | 8/2015 | Edwards | G06Q 20/40 |
| 9,568,955 B2 | 2/2017 | Voege et al. | |
| 9,767,446 B2 | 9/2017 | Cooke et al. | |
| 10,325,253 B2 | 6/2019 | Artman et al. | |
| 2003/0164398 A1 | 9/2003 | Walker et al. | |
| 2004/0034564 A1 | 2/2004 | Liu | |
| 2008/0016456 A1 | 1/2008 | Friedland et al. | |
| 2009/0012900 A1 | 1/2009 | Morin et al. | |
| 2009/0094126 A1 | 4/2009 | Killian et al. | |
| 2009/0164354 A1 | 6/2009 | Ledbetter et al. | |
| 2009/0259516 A1 | 10/2009 | Zeevi et al. | |
| 2010/0128047 A1 | 5/2010 | Makino et al. | |
| 2010/0128048 A1 | 5/2010 | Makino et al. | |
| 2010/0235249 A1 | 9/2010 | Smith et al. | |
| 2011/0059777 A1 | 3/2011 | Rao | |
| 2012/0197744 A1 | 8/2012 | Rose et al. | |
| 2012/0290420 A1 | 11/2012 | Close | |
| 2012/0290421 A1 | 11/2012 | Qawami et al. | |
| 2013/0144731 A1 | 6/2013 | Baldwin et al. | |
| 2014/0108108 A1 | 4/2014 | Artman et al. | |
| 2014/0249951 A1 | 9/2014 | Gotanda et al. | |
| 2015/0019356 A1 | 1/2015 | Bagdonas et al. | |
| 2015/0095133 A1 | 4/2015 | Parker et al. | |
| 2015/0185768 A1 | 7/2015 | Voege et al. | |
| 2015/0199668 A1 | 7/2015 | Fernando et al. | |
| 2015/0199882 A1 | 7/2015 | Fernando et al. | |
| 2015/0287012 A1 | 10/2015 | Takasu et al. | |
| 2015/0332382 A1 | 11/2015 | Aso et al. | |
| 2015/0338917 A1 | 11/2015 | Steiner et al. | |
| 2015/0363757 A1 | 12/2015 | Mocko et al. | |
| 2016/0063563 A1 | 3/2016 | Abad Fernandez et al. | |
| 2016/0070964 A1 | 3/2016 | Conrad | |
| 2016/0117529 A1 | 4/2016 | Bedier et al. | |
| 2016/0117659 A1 | 4/2016 | Bedier et al. | |
| 2016/0117662 A1 | 4/2016 | Bedier et al. | |
| 2016/0124627 A1* | 5/2016 | Beatty | G06Q 20/202 705/16 |
| 2016/0125449 A1* | 5/2016 | Beatty | G06Q 20/202 705/14.38 |
| 2017/0076269 A1* | 3/2017 | Saeed | G07G 1/0018 |
| 2017/0364888 A1 | 12/2017 | Bell et al. | |
| 2018/0039965 A1* | 2/2018 | Han | G07F 7/1033 |
| 2018/0137491 A1 | 5/2018 | Sanders et al. | |
| 2018/0150817 A1 | 5/2018 | Han et al. | |

FOREIGN PATENT DOCUMENTS

| | | |
|---|---|---|
| WO | 2015/191468 A1 | 12/2015 |
| WO | 2016/069775 A1 | 5/2016 |
| WO | 2017/222696 A1 | 12/2017 |

OTHER PUBLICATIONS

Final Office Action dated May 17, 2019, for U.S. Appl. No. 15/142,966, of Bell, B., et al., filed Apr. 29, 2016.
"At a Glance PCI Data Storage, PCI Data Storage Do's and Don'ts," PCI Security Standards Council Llc, dated Dec. 31, 2008, Retrieved from the Internet URL: http://web.archive.org/web/20140704155237/ https://www.pcisecuritystandards.org/pdfs/pci_fs_data_storage.pdf, on Feb. 8, 2017, pp. 1-2.
Non-Final Office Action dated Mar. 13, 2015, for U.S. Appl. No. 14/572,692, of Bell, B., et al., filed Dec. 16, 2014.
Final Office Action dated Jul. 10, 2015, for U.S. Appl. No. 14/572,692, of Bell, B., et al., filed Dec. 16, 2014.
Non-Final Office Action dated Mar. 11, 2016, for U.S. Appl. No. 14/572,692, of Bell, B., et al., filed Dec. 16, 2014.
Non-Final Office Action dated Oct. 4, 2018, for U.S. Appl. No. 15/188,711, of Bell, B., et al., filed Jun. 21, 2016.
Non-Final Office Action dated Nov. 2, 2018, for U.S. Appl. No. 15/142,966, of Bell, B., et al., filed Apr. 29, 2016.
International Search Report and Written Opinion for International Application No. PCT/US2016/068914, dated Feb. 16, 2017.
International Search Report and Written Opinion for International Application No. PCT/US2017/033370, dated Jul. 21, 2017.
Notice of Allowance dated Jul. 25, 2019, for U.S. Appl. No. 15/188,711, of Bell, B., et al., filed Jun. 21, 2016.
Final Office Action dated Sep. 11, 2019, for U.S. Appl. No. 15/496,529, of Han, K., et al., filed Apr. 25, 2017.
Advisory Action dated Sep. 23, 2019, for U.S. Appl. No. 15/142,966, of Bell, B., et al., filed Apr. 29, 2016.
Non-Final Office Action dated Oct. 18, 2019, for U.S. Appl. No. 15/720,749, of Han, K., et al., filed Sep. 29, 2017.
Notice of Allowance dated Dec. 16, 2019, for U.S. Appl. No. 15/496,529, of Han, K., et al., filed Apr. 25, 2017.
Examiner Requisition for Canadian Patent Application No. 3,027,525, dated Oct. 9, 2019.
Examination report for Australian Patent Application No. 2017281243, dated Nov. 13, 2019.
Notice of Allowance dated Apr. 6, 2020, for U.S. Appl. No. 15/142,966, of Bell, B., et al., filed Apr. 29, 2016.
English-language translation of Decision of Refusal for Japanese Patent Application No. 2018-566523, dated Feb. 3, 2020.
Final Office Action dated Apr. 15, 2020, for U.S. Appl. No. 15/720,749, of Han, K., et al., filed Sep. 29, 2017.
Corrected Notice of Allowability dated Apr. 29, 2020, for U.S. Appl. No. 15/142,966, of Bell, B., et al., filed Apr. 29, 2016.

\* cited by examiner

Merchant Terminal Operating-System Stack
802

| Application Programs 806 |
|---|
| State Machine 812    Protocol Buffer(s) 814    Point-of-Sale 816<br>Message Sizing 818    Applet Switcher 820 |
| Libraries/Utilities<br>808 |
| Operating System<br>810 |

Customer Terminal Operating-System Stack
804

| Application Programs 822 |
|---|
| State Machine 828    Protocol Buffer(s) 830    Accessibility 836<br>Message Sizing 832    Applet Switcher 834    Secure Payment Enclave 838 |
| Libraries/Utilities<br>824 |
| Operating System<br>826 |

FIG. 8

MESSAGE SIZING AND SERIALIZATION OPTIMIZATION

CROSS REFERENCE TO RELATED PATENT APPLICATIONS

This Application is a continuation of, and claims priority to, U.S. patent application Ser. No. 15/721,592, entitled "Message Sizing and Serialization Optimization" filed on Sep. 29, 2017, which is incorporated herein in its entirety.

BACKGROUND

Point-of-sale devices are typically merchant-facing devices and accept payments for the sale of goods or services. These point-of-sale devices do not have message sizing optimization, nor do these point-of-sale devices have message serialization. Additionally, traditional point-of-sale devices do not communicate card payment information through two operating-system stacks.

BRIEF DESCRIPTION OF THE DRAWINGS

The above and other features of the present disclosure, its nature and various advantages, will be more apparent upon consideration of the following detailed description, taken in conjunction with the accompanying drawings in which:

FIG. 8 depicts components of a merchant terminal operating-system stack and components of a customer terminal operating-system stack.

Figure 1:
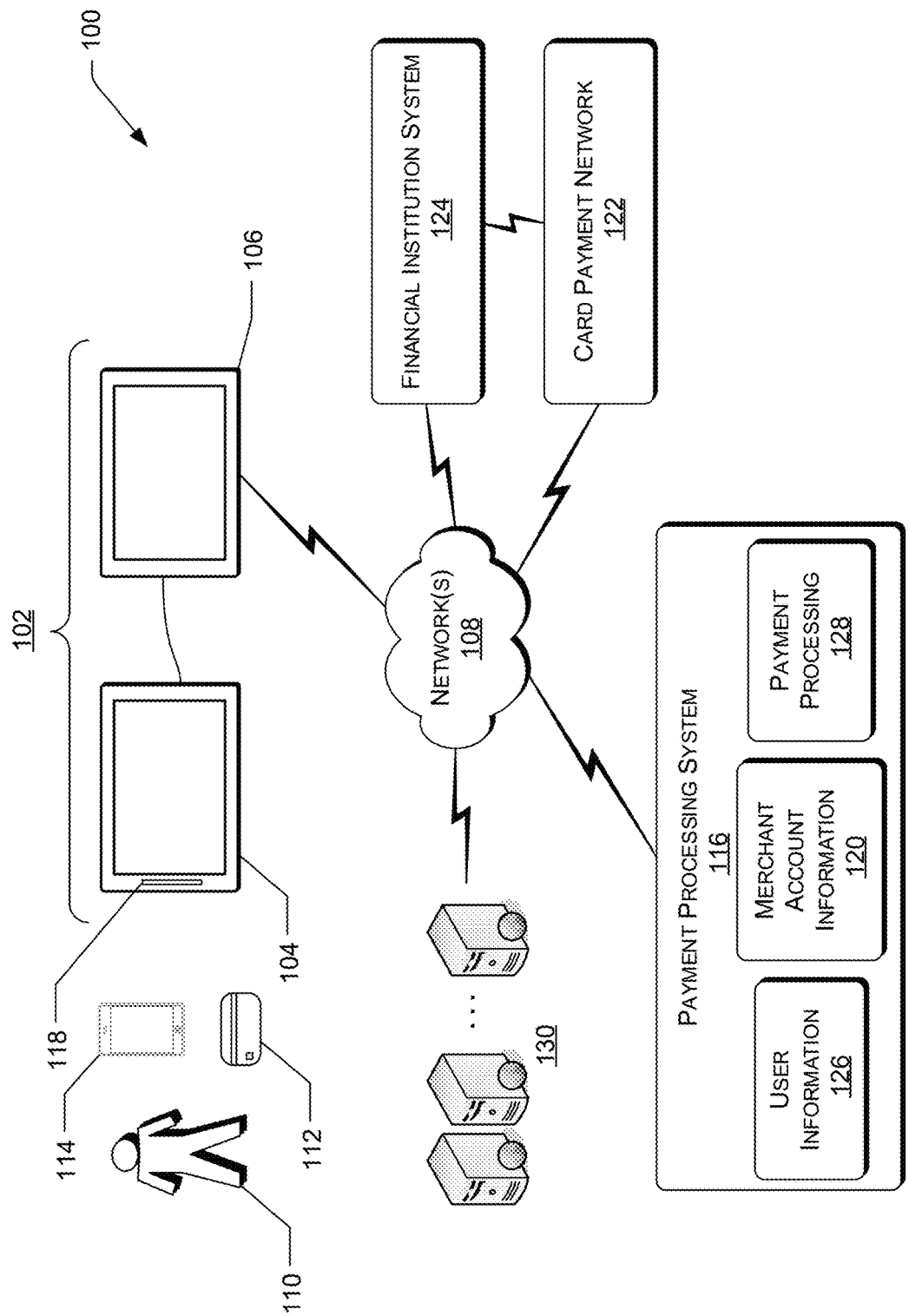
FIG. 1 depicts an example environment for a point-of-sale (POS) system configured to optimize message sizing and serialization.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

The techniques and systems described herein are directed to message size and serialization optimization. Take, for example, a point-of-sale (POS) device that includes a customer terminal and a merchant terminal. The customer terminal may be viewable by the customer, while the merchant terminal may be viewable by the merchant. The customer terminal may include a secure payment enclave that may include means for obtaining payment card information from a payment card. The payment card information may be obtained from the payment card such as from swiping the payment card, dipping the payment card, or tapping the payment card utilizing near-field communication technology. Generally, even if a typical POS device includes both a merchant terminal and a customer terminal, the customer terminal is used for simply acquiring the payment card information in total, sometimes without encryption. That payment card information is then sent from the merchant terminal to a remote system to process a payment.

However, when processing a payment, and when performing other actions by the POS system, such as refunds, transaction history queries, adding names to orders, etc., message sizing and message serialization optimization would make the transfer of payment card information between a customer terminal's secure payment enclave, other components of the customer terminal, the merchant terminal, and a remote system more secure and would reduce the bandwidth load on links between these devices and the computational load on processors for each of these devices. Depending on the state of the POS system, and/or its components, message sizing and/or serialization may differ.

For example, in a payment state corresponding to accepting payment in exchange for goods or services, the POS system may cause all or substantially all of the payment card information obtained from a payment card to be sent from the secure payment enclave of the customer terminal to the merchant terminal. In this example, the payment card information may be serialized using one or more protocol buffers from the secure payment enclave to other components of the customer terminal and/or from the customer terminal to the merchant terminal. In this example, given the sensitivity of the payment card information, the protocol buffer(s) used to serialize the information may correspond to protocol buffer(s) for highly confidential information.

In a refund state, a merchant and/or a customer may desire to search for a transaction corresponding to goods to be returned for a refund. In this refund state, the POS system may cause only a portion of the payment card information, such as a payment card identifier, to be obtained from the payment card and/or to be sent from the secure payment enclave to other components of the customer terminal and/or to the merchant terminal. By so doing, message sizing optimization reduces the amount of information transmitted between the customer terminal and the merchant terminal, and between the merchant terminal and the remote system, which increases security as to the information not transmitted and would reduce the bandwidth load on links between these devices and reduces the computational requirements on the customer terminal, the merchant terminal, and the remote system. Reducing the computational requirements on the components of the POS system and the remote system results in the transaction proceeding more quickly and with less opportunity for failure. Additionally, or alternatively, the payment card identifier information may be serialized before being sent from the secure payment enclave to the other components of the customer terminal and/or before being sent from the customer terminal to the merchant terminal. Given that a payment card identifier may still be considered sensitive information, the protocol buffer used to serialize the information may correspond to a protocol buffer for highly confidential information.

In a transaction-history state, a merchant and/or customer may desire to obtain information about previous transactions that the customer has been involved in with respect to a given payment card, such as transactions between the customer and the merchant. In this transaction-history state, the POS system may cause only a portion of the payment card information, such as a payment card identifier, a name associated with the payment card, contact information associated with the payment card, and/or an address associated with the payment card to be obtained from the payment card and/or to be sent from the secure payment enclave to other components of the customer terminal and/or to the merchant terminal. Again, by limiting the information sent to and from the various components of the POS system and the remote system, message sizing optimization reduces the amount of information transmitted between the customer terminal and the merchant terminal, and between the merchant terminal and the remote system, which increases security as to the information not transmitted and reduces the computational requirements on the customer terminal, the merchant terminal, and the remote system. Reducing the computational requirements on the components of the POS system and the remote system results in the transaction proceeding more quickly and with less opportunity for failure. Additionally, or alternatively, one or more protocol buffers may be used to serialize the information passed from the secure payment enclave to the other components of the customer terminal and/or from the customer terminal to the merchant terminal. In instances where the payment card information passed between the various components of the POS system include, for example, a name or name indicator, a protocol buffer corresponding to less confidential information may be utilized.

In a name state, a merchant may be desired to obtain a name or name indicator associated with the payment card, such as when the merchant is a restaurant and desires to add the name and/or name indicator to a ticket. In this name state, the POS system may cause only a portion of the payment card information, such as a name associated with the payment card, to be obtained from the payment card and/or to be sent from the secure payment enclave to other components of the customer terminal and/or to the merchant terminal. Again, limiting the information sent to and from the various components of the POS system and the remote system reduces the amount of information transmitted between the customer terminal and the merchant terminal, and between the merchant terminal and the remote system, which increases security (given that some information is not transmitted) and reduces the computational requirements on the customer terminal, the merchant terminal, and the remote system. Reducing the computational requirements on the components of the POS system and the remote system results in the transaction proceeding more quickly and with less opportunity for failure. Additionally, or alternatively, one or more protocol buffers may be used to serialize the information passed from the secure payment enclave to the other components of the customer terminal and/or from the customer terminal to the merchant terminal. A protocol buffer corresponding to less confidential information may be utilized in this name state.

The transfer of size-optimized and serialized messages from the secure payment enclave to other components of the customer terminal to the merchant terminal to a remote system may be performed over two operating-system stacks. For example, the customer terminal may include memory having a first operating-system stack while the merchant terminal may include memory having a second operating-system stack. The payment card information, or a portion thereof, obtained from the secure payment enclave may pass through both the first operating-system stack and the second operating-system stack before being sent to a remote system for processing.

The techniques described herein affect computer operations in various ways. For example, message sizing optimization, which may be dependent on a state of a POS system, reduces the amount of data transmitted from a secure payment enclave to other components of a customer terminal and/or from the customer terminal to a merchant terminal of the POS system, and/or from the merchant terminal to a remote system. The reduced data flow increases processing speed by the processors of the customer terminal, the merchant terminal, and the remote system, decreases the data storage and use requirements for the various components of the POS system, and ultimately speeds up the transaction process. By way of further example, message serialization optimization, which may be dependent on a state of a POS system, increases the security of information transferred between the secure payment enclave and the other components of the customer terminal and/or from the customer terminal to the merchant terminal.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

The terms "component" or "module" refer broadly to software stored on non-transitory storage medium (e.g., volatile or non-volatile memory for a computing device), hardware, or firmware (or any combination thereof) modules. Components and/or modules are typically functional such that they that may generate useful data or other output using specified input(s). A component and/or module may or may not be self-contained. An application program (also called an "application") may include one or more components and/or modules, or a component and/or module may include one or more application programs.

The preceding introduction is provided for the purpose of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 depicts an example environment 100 for a point-of-sale (POS) system 102 configured to optimize message sizing and serialization. The POS system 102 may include a customer terminal 104 and a merchant terminal 106. The customer terminal 104 may be utilized by a customer during, for example, a payment transaction. The merchant terminal 106 may be utilized by a merchant during, for example, a payment transaction.

In examples, the customer terminal 104 and the merchant terminal 106 may include one or more processing units, memory, and one or more network interfaces. In examples, the processing unit(s) may execute one or more modules and/or processes to cause the customer terminal 104 and/or the merchant terminal 106 to perform a variety of functions, as set forth above and explained in further detail in the following disclosure. In some examples, the processing unit(s) may include a central processing unit (CPU), a graphics processing unit (GPU), both CPU and GPU, or other processing units or components known in the art. Additionally, each of the processing unit(s) may possess its own local memory, which also may store program modules, program data, and/or one or more operating systems. Depending on the exact configuration and type of the customer terminal 104 and/or the merchant terminal 106, the memory, also described herein as computer-readable media, may include volatile memory (such as RAM), non-volatile memory (such as ROM, flash memory, miniature hard drive, memory card, or the like), or some combination thereof.

The memory (as well as all other types of memory or storage described herein) may include one or a combination of computer storage media. Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer storage media does not include communication media, such as modulated data signals and carrier waves. As such, computer storage media is non-transitory media.

In various examples, the customer terminal 104 and/or the merchant terminal 106 may include one or more input/output interface(s). Examples of input/output interface(s) may include one or more cameras, one or more speakers, one or more microphones, a keyboard, a mouse, a pen, a touch input device, a display, etc. Furthermore, the merchant terminal 106 may include one or more network interfaces for interfacing with the network(s) 108, as described below. The network interfaces may be any network interface hardware components that may allow the merchant terminal 106 to communicate over the network(s) 108. The one or more networks 108 may be any type of network, such as a local area network or a wide area network, such as the Internet, and may include a wireless network, such as a cellular network, a local wireless network, such as Wi-Fi and/or close-range wireless communications, such as Bluetooth® and Bluetooth® low energy, a wired network, or any other such network, or any combination thereof. Accordingly, the one or more networks 108 may include both wired and/or wireless communication technologies, including Bluetooth®, Bluetooth® low energy, Wi-Fi, and cellular communication technologies, as well as wired or fiber optic technologies. Components used for such communications can depend at least in part upon the type of network, the environment selected, or both. Consequently, one or more computing devices of the environment 100 may communicatively couple to the one or more networks 108 in any manner, such as by a wired or wireless connection.

In at least one example, the memory may include one or more modules or instructions to enable the POS system 102 to determine whether background processes or modules are operating on the POS system 102. The one or more modules or instructions may be implemented as more processes or as fewer processes, and functions described for the processes may be redistributed depending on the details of the implementation. The terms "module" and "component" refer broadly to software stored on non-transitory storage medium (e.g., volatile or non-volatile memory for a computing device), hardware, or firmware (or any combination thereof) modules. Modules and components are typically functional such that they that may generate useful data or other output using specified input(s). A module and/or component may or may not be self-contained. An application program (also called an "application") may include one or more modules and/or components, or a module and/or a component may include one or more application programs. In some examples, a module and/or component may include an Application Program Interface (API) to perform some or all of its functionality (e.g., operations). In additional and/or alternative examples, the module(s) and/or component(s) may be implemented as computer-readable instructions, various data structures, and so forth via at least one processing unit (e.g., processing unit(s)) to configure the POS system 102 to execute instructions and to perform operations described herein.

In the example of FIG. 1, a buyer 110 can use any of a variety of payment objects, such as a payment card 112, when participating in a transaction with a merchant. A buyer 112 may typically have payment cards 112 such as credit cards, debit cards, prepaid cards, and the like, that the buyer 110 may use for conducting a transaction. In examples, the payment card 112 may include one or more magnetic stripes for providing payment card information and/or buyer information when swiped in a payment-object reader 118. In examples, other types of payment cards 112 may be used, such as, for example, smart cards having a built in integrated circuit including a memory chip (e.g., EMV payment cards), a radio frequency identification tag (e.g., near field communication (NFC) enabled objects), and the like. In examples, the user 110 may use a user device 114 to conduct NFC payment transactions through communication between the user device 114 and the payment-object reader 118, for example. In examples, the user device 114 may be used to interact with the customer terminal 104 to perform certain transactions, such as a transaction using an NFC-enabled device of the customer. It should be noted that the user device 114 is not limited to only NFC-enabled devices.

The POS system 102 in the example of FIG. 1 illustrates a merchant terminal 106 associated with the merchant that may participate in a payment service provided by a service provider of a payment processing system 116. The merchant terminal 106 may be a computing device (e.g., a mobile computing device) able to communicate with the payment processing system 116, and with various other computing devices, through suitable communication protocols, interfaces, and networks, including network 108. Further, the merchant terminal 106 may be any appropriate device operable to send and receive requests, messages, or other types of information over the network 108. Additionally, while only a single merchant terminal 106 is illustrated in the example of FIG. 1, in some examples there can be additional merchant terminals depending on the number of merchants participating in the payment service, or multiple components arranged as a POS system.

Each POS system 102 may include an instance of a merchant application executed on the POS system 102. The merchant application may provide POS functionality to enable the merchant to accept payments at a POS location using the POS system 102. In some types of businesses, the POS location may correspond to a store or other place of business of the merchant, and thus, may be a fixed location that typically does not change on a day-to-day basis. In other types of businesses, however, the POS location may change from time to time, such as in the case that the merchant operates a food truck, is a street vendor, a cab driver, or has an otherwise mobile business, e.g., in the case of merchants who sell items at buyers' homes, buyers' places of business, and so forth.

The customer terminal 104 of the POS system 102 may be communicatively coupled to a payment-object reader 118 having a secure payment enclave, either by direct connection, or through wireless connection, such as WiFi, BlueTooth, BLE (Bluetooth low energy), NFC, or other appropriate short-range communication. The payment-object reader 118 may read data from a magnetic stripe card or an EMV chip-type card and communicate the data to other components of the customer terminal 104. The payment-object reader 118 may also read data from an NFC device and communicate the data to the customer terminal 104. The payment-object reader 118 is shown as being integral to the customer terminal 104, however in examples, the payment-object reader 118 may be a separate component coupled to the customer terminal 104.

Accordingly, the merchant and the buyer 110 may conduct a transaction by which the buyer 110 acquires an item or service from the merchant at a POS location. The merchant application on the POS system 102 may send transaction information to the payment processing system 116, e.g., as the transaction is being conducted at the POS location. In examples, such as if a particular merchant terminal 106 is not connected to the network 108 and is therefore processing transactions offline, the transaction information can be sent in a batch at a subsequent point in time or using other suitable techniques. In some embodiments, the transaction information can be sent via SMS, MMS, or a voice call.

In examples, the payment processing system 116 may be configured to send and receive data to and from the user device 114 and the POS system 102. For example, the payment processing system 116 may be configured to send data describing merchants to the user device 114 using, for example, the information stored in the merchant account information database 120. The data describing merchants can include, for example, a merchant name, geographic location, contact information, and an electronic catalogue, e.g., a menu that describes items that are available for purchase from the merchant.

In examples, the payment processing system 116 may additionally, or alternatively, be configured to communicate with a computer system of a card payment network 122, e.g., Visa or MasterCard, etc., over the network 108, or over a different network, for example, to conduct electronic financial transactions. The computer system of the card payment network 122 may communicate with a computer system of a financial institution system 124, e.g., a bank. There may be computer systems of other entities, e.g., the card acquirer, between the payment system and the computer system of the card issuer.

The payment processing system 116 may then communicate with the computer system of a card payment network 122 to complete an electronic financial transaction for the total amount to be billed to the customer's financial account. Once the electronic financial transaction is complete, the payment processing system 116 may communicate data describing the payment transaction to the user device 114, e.g., an electronic receipt, which may, for example, notify the customer 110 of the total amount billed for the payment transaction with the particular merchant.

To accept electronic payments using the POS system 102, the merchant may create a merchant account with the payment processing system 116 by providing information describing the merchant including, for example, merchant name, contact information (e.g., telephone numbers, the merchant's address, and one or more financial accounts to which funds collected from buyers will be deposited). This merchant information may be securely stored by the payment processing system 116, for example, as merchant account information 120 in a secure database. Further, the merchant information can include a merchant profile created for each merchant. The merchant profile can include information about the merchant and transaction information associated with transactions conducted by the merchant. User information 126 may likewise be securely stored by the payment processing system 116 for the customers to enable customers to conduct various financial transactions.

The payment processing system 116 may provide a payment service in which merchants are able to conduct transactions with multiple buyers, such as for selling services and/or products to the buyers. The payment processing system 116 may include one or more servers that are configured to process secure electronic financial transactions, e.g., payment during a transaction, by communicating with the POS system 102, card payment networks 122, and bank or other financial institution payment systems 124. The payment processing system 116 includes a payment processing module 128 that may receive transaction information for processing payments made through the merchant application. For example, the payment processing module 128 may receive transaction information, such as an amount of the transaction, and can verify that a particular payment card 112 may be used to pay for the transaction, such as by contacting a card clearinghouse of a card payment network 122. Furthermore, in examples, the payment processing module 128 may redirect payment information for transactions to be made using payment card 112 to a bank, or other financial institution, such as the payment processing system 116. In other examples, the POS system 102 may communicate directly with an appropriate card payment network 122 or financial institution system 124 for approving or denying a transaction using a particular payment card 112 for a transaction.

As introduced above, the payment processing system 116 may be configured to communicate with one or more systems of a card payment network 122 (e.g., MasterCard®, VISA®, or the like) over the network 108 to conduct financial transactions electronically. The payment processing system 116 may also communicate with one or more bank payment systems of one or more banks over the network 108. For example, the payment processing system 116 may communicate with an acquiring bank, a payment card issuing bank, and/or a bank maintaining buyer accounts for electronic payments.

A payment card acquiring bank may be a registered member of a card association (e.g., Visa®, MasterCard®, or the like), and can be part of a card payment network. A payment card issuing bank can issue payment cards to buyers, and can pay acquiring banks for purchases made by cardholders to which the issuing bank has issued a payment card. Accordingly, in examples, the systems of an acquiring bank can be included in the card payment network and can communicate with systems of a payment card issuing bank to obtain payment. Further, in examples, bank payment systems may include systems associated with debit card issuing institutions, in which case, the systems of the debit card issuing institution can receive communications regarding a transaction in which the buyer uses a debit card instead of a credit card. Additionally, there can be systems of other financial institutions involved in some types of transactions or in alternative system architectures and thus, the foregoing are merely several examples.

The network 108 may be a conventional type, wired or wireless, and can have numerous different configurations including a star configuration, token ring configuration, or other configurations. Furthermore, the network 108 can include an intranet, a local area network (LAN), a wide area network (WAN) (e.g., the Internet), and/or other interconnected data paths across which multiple devices can communicate. In some embodiments, the network 108 may be a peer-to-peer network. The network 108 may also be coupled with or include portions of a telecommunications network for sending data using a variety of different communication protocols. In examples, the network 108 may include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 1 illustrates one network 108 coupled to the POS system 102, the payment processing system 116, the card payment network 122, and financial institution system 124, more than one network 108 may connect these entities. The POS system 102, the payment processing system 116, and the user device 114 may communicate over the network 108 using wired or wireless connections, or combinations thereof.

The environment 100 may additionally include a remote system 130. As shown in FIG. 1, the remote system 130 may be a separate system from the payment processing system 116, or the remote system 130 may be a component of the payment processing system 116. The remote system 130 may store information associated with the buyer 110, other buyers, transactions associated with the payment card 112, and other payment card data. The remote system 130 may be configured to receive payment card information from, for example, the POS system 102, along with data indicating requests for information associated with the payment card information. For example, the remote system 130 may provide transaction history information indicating one or more transactions and details of those transactions to the POS system 102, such as in response to a query for payment card transaction history and/or for finding a transaction on which to perform a refund.

The memory of the POS system 102 may be configured to perform various operations in addition to those described above. For example, the memory of the POS system 102 may include a state machine component, which may determine a state of the POS system 102. While the POS system 102 may have multiple potential states, some of those states may include a payment state, a refund state, a transaction-history state, and a name state. When in any of these states, certain functionality of the POS system 102 may be enabled while other functionality may be disabled and/or may operate in different manners.

The memory may additionally include a message sizing component configured to determine which portions of payment card information are to be communicated between the payment-object reader 118 and other components of the customer terminal 104 and/or from the customer terminal 104 to the merchant terminal 106. The message sizing component may optimize message sizing based at least in part on the state of the POS system 102, which may be determined via the state machine component of the POS system 102. For example, in a payment state, the message sizing component may cause all or substantially all of the payment card information obtained from the payment-object reader 118 to be sent from the payment-object reader 118 to other components of the customer terminal 104 and/or to the merchant terminal 106. By way of further example, in a refund and/or a transaction-history state, the message sizing component may cause a payment card identifier to be sent from the payment-object reader 118 to the customer terminal 104 and/or the merchant terminal 106 while preventing other information obtained from the payment card from being sent. By way of further example, in a name state, the message sizing component may cause a name associated with the payment card to be sent from the payment-object reader 118 to the customer terminal 104 and/or the merchant terminal 106 while preventing other information obtained from the payment card from being sent.

The memory may also include a message serialization component, which may serialize information sent between the payment-object reader 118, other components of the customer terminal 104, and/or the merchant terminal 106. The message serialization may be based at least in part on one or more protocol buffers being applied to the payment card information, or portion thereof. The message serialization may be state dependent. For example, portions of the payment card information may be associated with various confidentiality levels, and the confidentiality levels may be associated with protocol buffers. By way of example, highly confidential payment card information may be associated with a protocol buffer that results in custom serialized data, which may be difficult to obtain through nefarious means. In other examples, less confidential payment card information may be associated with a protocol buffer that results in general serialization of data, which may be easier to obtain through nefarious means but may also be less data intensive.

The memory of the POS system 102 may also include one or more databases. The databases may store and/or access data and information of various types. By way of example, the databases may store and/or access one or more user profiles and/or user accounts. The user profiles/accounts may include identifying information about users of various devices, as well as historical and/or contextual information associated with such users. The databases may additionally, or alternatively, store and/or access one or more device identifications. A device identification may indicate an internet protocol address and/or other identifying information associated with devices, such as the device. The device identification may additionally include data indicating one or more relationships between devices. For example, the device may be a mobile phone associated with a given user profile and/or user account. Other devices may also be associated with the user profile and/or the user account, such as, for example, a computer, a tablet, a router, a modem, a speaker, a voice-assistant device, a vehicle, and/or a network. Identification information for all or some of these devices may be stored and/or accessed using the device identification component of the databases to, for example, be utilized for payment processing, transaction history querying, and/or refunds, for example.

Figure 2:
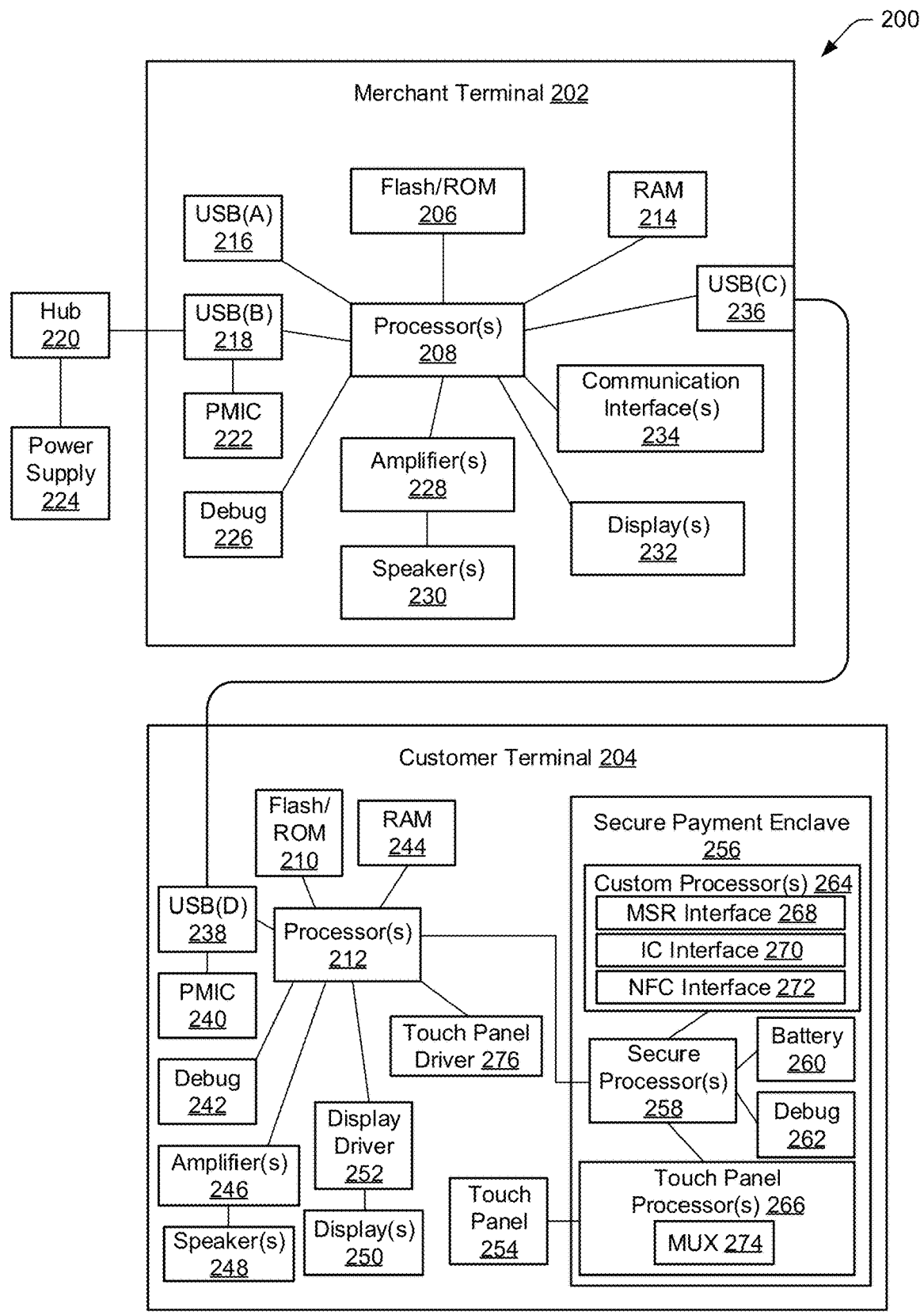
FIG. 2 depicts an example merchant terminal and an example customer terminal.

FIG. 2 depicts an example POS system 200 with an example merchant terminal 202 and an example customer terminal 204. The merchant terminal 202 includes non-transitory computer readable instructions stored in memory 206 that when interpreted by a merchant terminal processor 208 causes the merchant terminal processor 208 to perform one or more operations and display one or more screens in a display of the merchant facing graphical user interface for guiding a merchant through a transaction, for example. The customer terminal 204 includes non-transitory computer readable instructions stored in memory 210 that when interpreted by a customer terminal processor 212 may cause the customer terminal processor 212 to perform one or more operations and/or to display one or more screen in a customer facing graphical user interface on the display for guiding the customer through a transaction, for example.

The merchant terminal 202 may include a SoC (System-on-chip) processor 208 and associated flash memory 206 and RAM 214. A USB(A) port 216 may be provided for connecting other devices or components to the merchant terminal 202. A USB(B) port 218 may be provided to connect to a hub 220 for one or more peripheral devices associated with POS system 200, including, for example, a receipt printer, cash drawer, barcode scanner, scale, keyboard, USB-Ethernet dongle/USB mifi, and/or other peripheral components. While both a USB(A) port 216 and a USB(B) 218 port are separately identified in FIG. 2, it should be understood that these components may be combined into a single component. Additionally, although the connectors are shown as being USB, any universal adapter can be implemented to connect other devices to the merchant terminal 202 and to connect the merchant terminal 202 to the customer terminal 204. A Power Management Integrated Circuit (PMIC) 222 may be in communication with the USB(B) port 218. A PMIC 222 may be an integrated circuit for managing power requirements of the host system. The merchant terminal 202 may have any number of USB ports, and the ports may be of any suitable characteristic. A power supply 224 may be provided as power through the hub 220 via connector USB(B) 218 on the merchant terminal 202. A debug application 226 may be provided for debugging of the merchant terminal 202 and the various components thereof. An audio amplifier 228 and a speaker 230 may be provided for outputting audio from the merchant terminal 202.

The processor 208 may cause a display 232 to present renderings corresponding to, for example, a transaction. The display 232 may provide interfaces and outputs to the merchant terminal 202 to be viewed by a merchant. One or more communication interface(s) 234 may be in communication with the processor 208 to communicate between the merchant terminal 202 and, for example, the customer terminal 204 and/or other POS system components, or, for example, a payment system. The communication interface 234 may include one or more interfaces and/or hardware components for enabling communication with various other devices, such as over the network(s) 108 shown in FIG. 1. For example, the communication interface 234 may enable communication through one or more of the internet, cable networks, wireless networks (e.g., Wi-Fi), and wired networks, as well as close-range communications, such as Bluetooth®, Bluetooth® Low Energy (BLE), near field communication (NFC), as additionally enumerated elsewhere herein. The communication interface(s) 234 may include, for example, a GPS transceiver, a Wi-Fi transceiver, and/or other communication mediums.

In examples, the communication interface 234 may include a cellular communications transceiver for sending and receiving data over a cellular communications network such as via voice call, short messaging service (SMS), multimedia messaging service (MMS), hypertext transfer protocol (HTTP), direct data connection, WTP, e-mail or another type of electronic communication. In examples, the communication interface 234 may also provide other conventional connections to the network for distribution of files and/or media objects using standard network protocols such as TCP/IP, HTTP, HTTPS and SMTP, etc.

A USB(C) port 236 may be provided for detachably connecting the merchant terminal 202 to the customer terminal 204. The term "detachably" is intended to refer to the ability for the merchant terminal 202 to be connected to the customer terminal 204 but also configured to be detached from the customer terminal 204 when desired for storage, upgrades, or other uses. This mating between the terminals may be through direct wired connections, as shown in FIG. 2, or wirelessly, for example.

Other components included in the merchant terminal 202 may include various types of sensors (not shown), which may include a GPS device, an accelerometer, gyroscope, compass, proximity sensor, etc. Additionally, the merchant terminal 202 may include various other components that are not shown, examples of which include removable storage, an internal power source such as a battery and a power control unit, for example.

The customer terminal 204 may include one or more processors 212 connected to a connector, such as USB(D) 238, which may be a USB, mini-USB, or micro-USB, for communication with the merchant terminal 202. The processor 212 may be a system on a chip (SoC) processor in examples. A Power Management Integrated Circuit (PMIC) 240 may be in communication with the USB(D) 238. The PMIC 240 may be an integrated circuit for managing power requirements of the host system. A debug application 242 may be provided for the processor 212 for debugging of the customer terminal 204 and/or the various components thereof. The processor 212 may be coupled to flash memory 210 and RAM 244 for storage and processing of data. An audio amplifier 246 and a speaker 248 may be provided for output of audio from the customer terminal 204. A display 250 may also be provided. The display 250 may provide one or more interfaces and the outputs of the POS system 200 to the customer terminal 204. A display driver 252 may control the display 250.

Memory in the merchant terminal 202 and the customer terminal 204, including flash/ROM 206, RAM 214, flash/ROM 210 and RAM 244 are examples of non-transitory computer storage media (e.g., computer-readable media) and can include volatile and non-volatile memory and/or removable and non-removable media implemented in any type of technology for storage of information such as computer-readable processor-executable instructions, data structures, program applications or other data. The computer-readable media can include, but is not limited to, RAM, ROM, EEPROM, flash memory, solid-state storage, magnetic disk storage, optical storage, and/or other computer-readable media technology. Further, in some cases, the merchant terminal 202 may access external storage, such as RAID storage systems, storage arrays, network attached storage, storage area networks, cloud storage, or any other medium that may be used to store information and that may be accessed by the processor directly or through another computing device or network. Accordingly, the memory 206, 214, 210, and/or 244 may be computer storage media able to store instructions, applications, or components that may be executed by the processors 208 and/or 212.

The display 250 of the customer terminal 204 and/or the display 232 of the merchant terminal 202 may be, for example, a liquid crystal display (LCD), a plasma display, a light emitting diode (LED) display, an organic light-emitting diode (OLED) display, an electronic paper display, or other type of display able to present digital content thereon. The customer terminal 204 may include a touch panel 254 associated with the display 250 to provide a touchscreen display configured to receive touch inputs for enabling interaction with a graphical user interface presented on the display 250. Accordingly, examples described herein are not limited to any particular display technology. In examples, the merchant terminal 202 may not include a display, and information may be presented via the speaker 230.

The customer terminal 204 may include a secure payment enclave 256. The secure payment enclave 256 may include one or more secure processors 258 coupled to the main processor 212, an anti-tamper battery 260, and a secure debug application 262. One or more of the processors, such as the merchant terminal processor 208, the customer terminal processor 212, the secure processor 258, a custom processor 264, and/or a touch panel processor 266, may comprise one or more processors or processing cores. For example, the processor(s) 208, 212, 258, 264, and/or 266 may be implemented as one or more microprocessors, microcomputers, microcontrollers, digital signal processors, central processing units, state machines, logic circuitries, and/or any devices that manipulate signals based on operational instructions. In some embodiments, the processor(s) 208, 212, 258, 264, and/or 266 may be one or more hardware processors and/or logic circuits of any suitable type specifically programmed or configured to execute the algorithms and processes described herein by performing various input/output, logical, and/or mathematical operations. The processor(s) 208, 212, 258, 264, and/or 266 may be configured to fetch and execute computer-readable processor-executable instructions stored in the memory 206, 214, 210, and/or 244.

The touch panel processor 266, in examples, may comprise a Cirque Cortex microcontroller chip, having an analog front end (AFE), a multiplexer, and/or a microcontroller. The secure processor 258 may receive inputs from the custom processor 264 equipped with a magnetic stripe interface 268, an integrated circuit interface 270, and/or a near field communication (NFC) interface 272.

Inputs received by the customer terminal 204 may be received at the touch panel 254 within the secure payment enclave 256, for example, as entries into a payment application or a register-buddy application in communication with the merchant terminal 202. Inputs received at the touch panel 254 may be sent to the touch panel processor 266 having a multiplexer 274. The touch panel processor 266 may be configured to cause the customer terminal 204 to be in a (1) a secure mode where secure data does not leave the secure payment enclave 256, and/or (2) a normal pass-through mode where the secure processor 258 determines completion of the secure data entry, where data is passed through to the main processor 212. Entries into the touch panel 254 may be received at the secure payment enclave 256 and handled by the secure processor 258. When in the pass-through mode, the secure processor 258 may pass inputs through to the main processor 212. When in the secure touch mode, the secure processor 258 may not pass inputs to the main processor 212, but rather may process the data within the secure payment enclave 256.

A multiplexer 274 may receive inputs from a touch panel 254 and may direct inputs to the main processor 212, via the touch panel driver 276 in a pass-through mode, and may direct inputs received from the touch panel 254 to the secure processor 258 when in the secure mode. In examples, the main processor 208 on the merchant terminal 202 the processor 208 on the customer terminal 204 may run their own operating system, which may be the same operating system, different versions of the same operating system, or different operating systems.

In examples, the secure payment enclave 256 of the customer terminal 204 may be accessible by a payment-object reader of the customer terminal 204. The payment-object reader may accept, such as through swiping, dipping, tapping, or other means a payment object, such as a credit card, debit card, or other payment object, payment card information. The payment card information may be accepted by the secure payment enclave 256 and, depending on the state of the POS system 200, the payment card information, or a portion thereof, may be serialized for transfer from the secure payment enclave 256 to one or more other components of the customer terminal 204 and/or to the merchant terminal 202.

Figure 3:
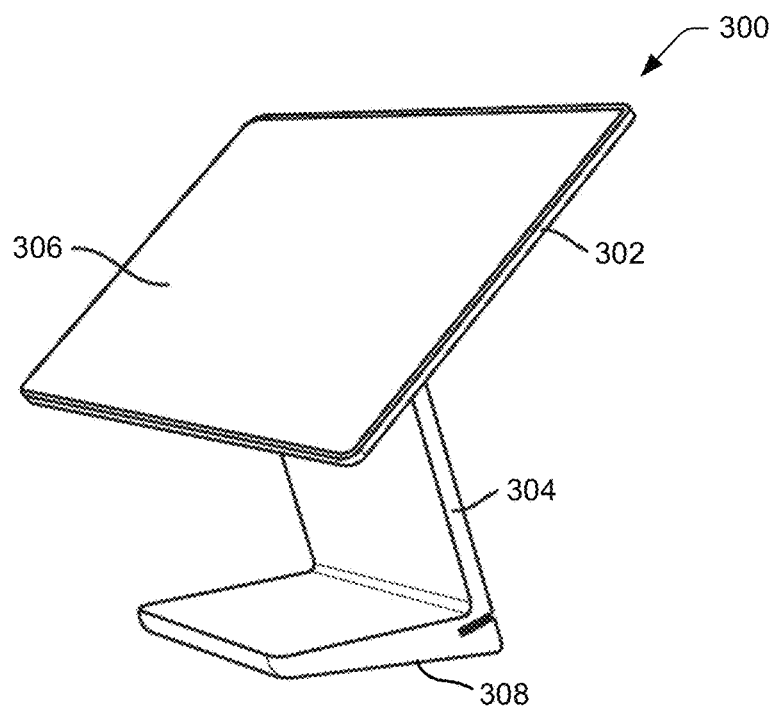
FIG. 3 depicts an example POS system with a merchant terminal and a customer terminal.

FIG. 3 depicts an example POS system 300 with a merchant terminal 302 and a customer terminal 304. FIG. 3 illustrates the POS system 300 as viewed from a front perspective view, including a first terminal 302 and a second terminal 304 that may be detachably mated together and shown in a fixed position, in accordance with examples described herein. The POS system 300 may include a first terminal 302 that may be configured, for example, to be a merchant terminal in a merchant-facing direction. The first terminal 302 may include a first computing device 306 and a base 308 into which the second terminal 304 may be detachably received. The first computing device 306 may be a separate device that may be inserted into the first terminal 302 or the first computing device 306 may be integral to the first terminal 302.

Figure 4:
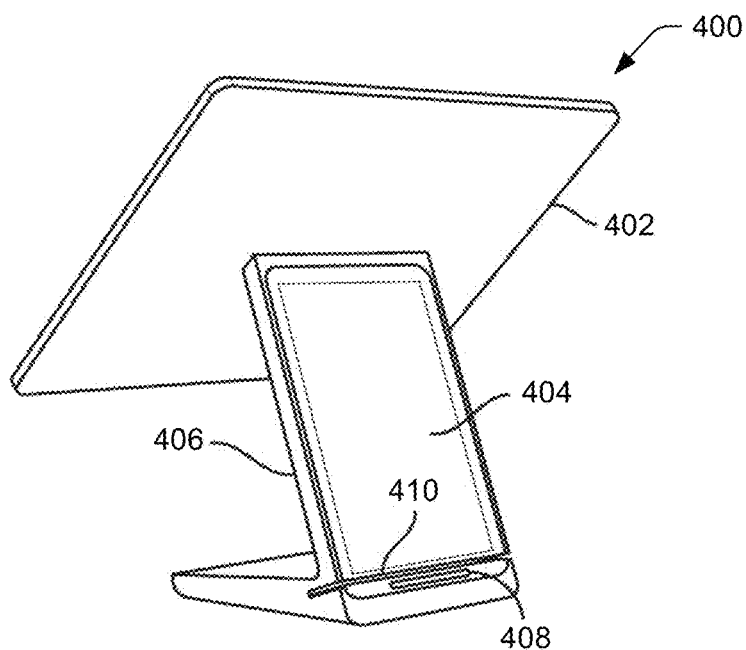
FIG. 4 depicts another example POS system with a merchant terminal and a customer terminal.

FIG. 4 depicts another example POS system 400 with a merchant terminal and a customer terminal. FIG. 4 illustrates the example POS system 300 of FIG. 3 as viewed from a back perspective view, in accordance with examples described herein. The base 406 of the first terminal 402 may detachably receive the second terminal 404. The second terminal 404 may include a first "dip slot" card reader 408 configured to read chip-type cards and/or a second "swipe slot" card reader 410 configured to read magnetic swipe-type cards. The term "dip slot" refers to a slot or other opening configured to receive or otherwise read a chip-type card via contact or contact-less EMV or NFC communication. In examples, a separate NFC interface may be provided on the second terminal 404. In examples, the card reader 408 and/or the card reader 410 may be replaced with a single hybrid card reader configured to accept both chip-type card and magnetic stripe-type cards, as well as NFC enabled payment objects.

Figure 5:
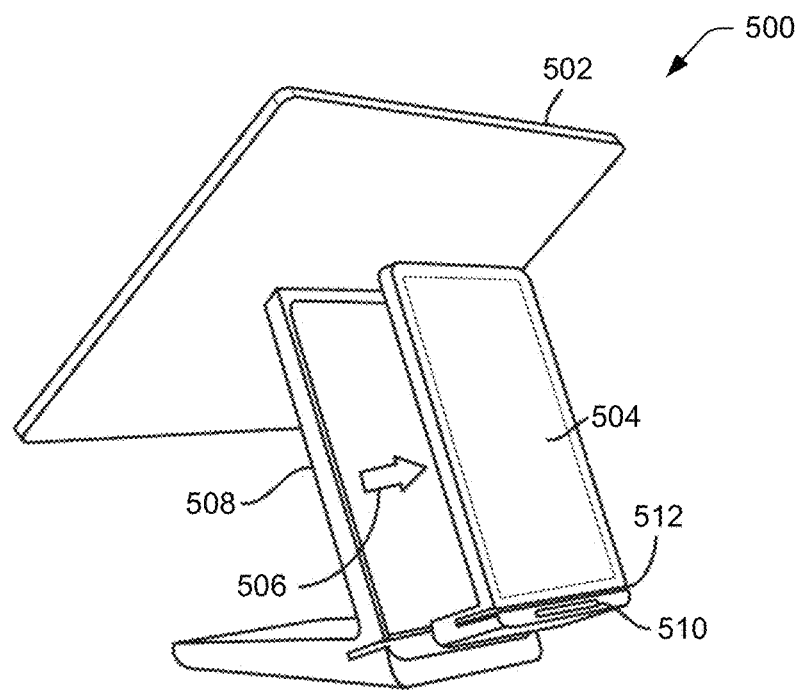
FIG. 5 depicts another example POS system with a merchant terminal and a customer terminal.

FIG. 5 depicts another example POS system 500 with a merchant terminal and a customer terminal. FIG. 5 illustrates the example POS system 500 of FIG. 5 as viewed from the back perspective view, and showing the second terminal 504 being separated from the first terminal 502, as shown by arrow 506. The POS system 500 may include some or all of the components of the POS system 400 from FIG. 4, such as, for example, a base 508 of the second terminal 504, a "dip-type" card reader 510, and/or a "swipe-type" card reader 512.

Figure 6:
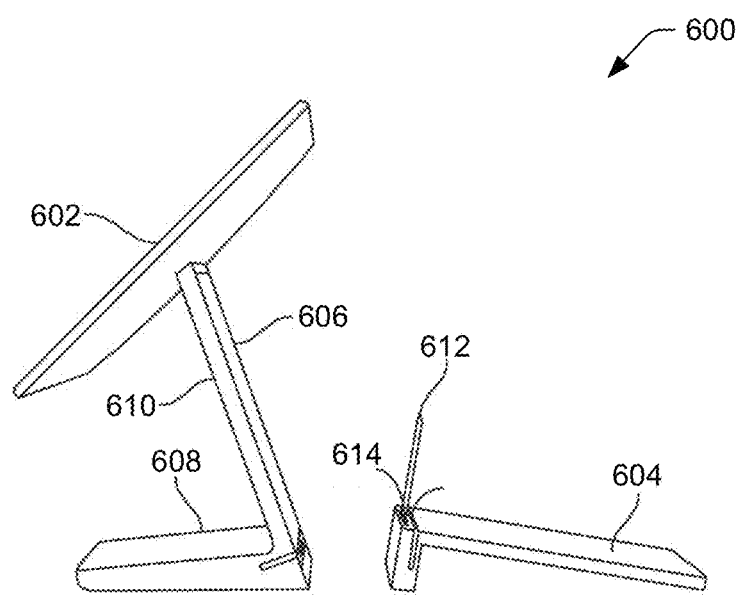
FIG. 6 depicts another example POS system with a merchant terminal and a customer terminal.

FIG. 6 depicts another example POS system 600 with a merchant terminal and a customer terminal. FIG. 6 illustrates the example POS system 600 of FIG. 6 as viewed from a side perspective view and showing the second terminal 604 separated from the first terminal 602. In this view, each terminal 602, 604 may be physically independent of the other and arranged in a separated position, or mated together as shown in FIG. 3. When separated as shown in FIG. 6, the first terminal 602 and the second terminal 604 may be in communication with each other or otherwise mated together via wired or wireless communication. As shown in FIG. 6, the first terminal 602 may include a base 606 having a substantially flat portion 608 that may contact a surface for supporting the first terminal 602 and an upper portion 610. A payment card 612 is shown inserted in the card reader 614 of the second terminal 604. The thin wedge shape of the second terminal 604 allows customers to pick up and hold the second terminal 604.

Figure 7:
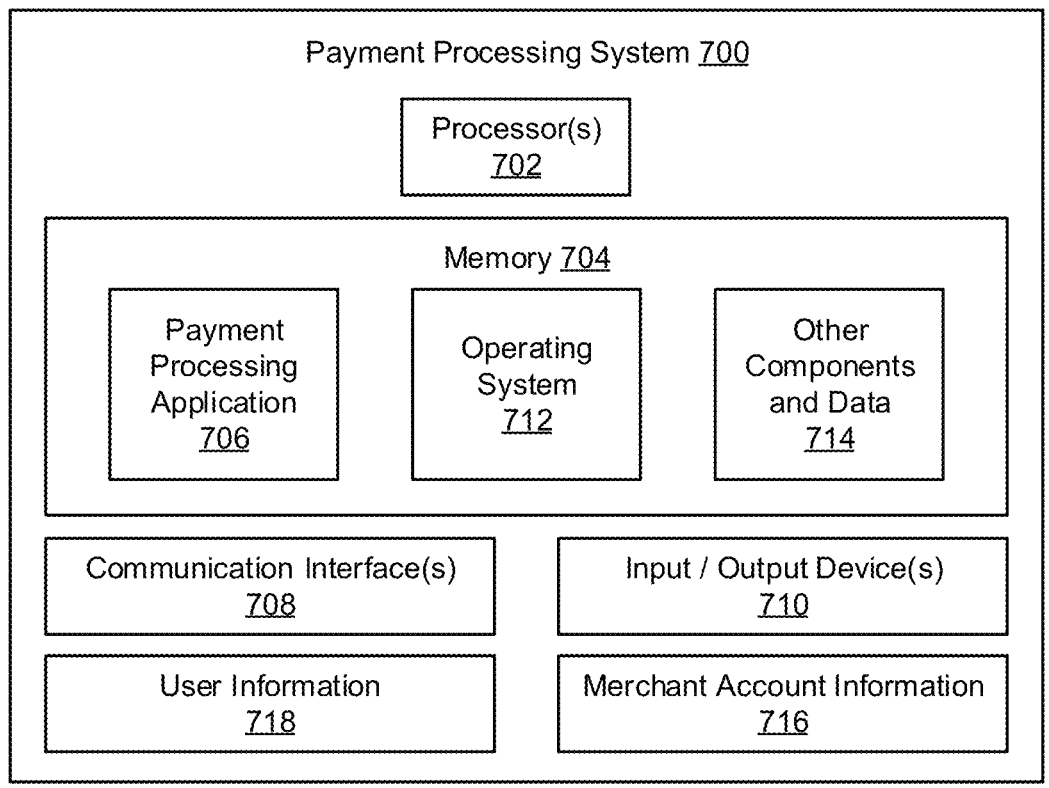
FIG. 7 depicts example components of a payment processing system.

FIG. 7 depicts example components of a payment processing system 700. The payment processing system 700 may be any type of computing device capable of sending communications and performing the functions according to the techniques described herein and may be operated by a service provider that provides the payment processing service. For example, in the case of a server, the applications, other functional components, and data may be implemented on a single server, a cluster of servers, a server farm or data center, a cloud-hosted computing service, a cloud-hosted storage service, and so forth, although other computer architectures can additionally or alternatively be used.

The payment processing system 700 may enable a service provider to provide a payment service in which merchants are able to conduct transactions with one or more buyers, such as for selling services and/or products to the buyers. The payment processing system 700 may include one or more processor(s) 702 (or servers) that may be configured to process secure electronic financial transactions, e.g., payment during a transaction, by communicating with the merchant terminal, card payment networks, and/or bank or other financial institution payment systems, as described more fully above with respect to FIG. 1. The payment processing system 700 may include a payment processing application 706, which may be stored on memory 704 of the payment processing system 700. The payment processing application 706 may receive transaction information for processing payments made through a POS system. For example, the payment processing application 706 may receive transaction information, such as an amount of the transaction, and may verify that a particular payment card may be used to pay for the transaction, such as by contacting a card clearinghouse of a card payment network. Furthermore, in some examples, the payment processing application 706 may redirect payment information for transactions to be made using payment cards to a bank, or other financial institutions or payment systems. In examples, the POS system may communicate directly with an appropriate card payment network or bank payment system for approving or denying a transaction using a particular payment card for a transaction.

As used herein, the term "payment card," "payment object," or "payment instrument" refers to a payment mechanism that includes a debit card, a conventional credit card, "smartcards" that have embedded circuits, such integrated circuit (IC) cards, such as, for example, Europay-MasterCard-Visa (EMV) cards, and NFC enabled payment cards, or any wallet-size card that functions as a combination of any of these payment mechanisms. In examples, a payment card, payment object, or payment instrument may also include a virtual payment card stored on a device such as a smart phone or other device and transmittable, for example, via near field communication (NFC) or other suitable means.

Further, while the examples herein illustrate the components and data of the payment processing system 700 as being present in a single location, these components and data may alternatively be distributed across different computing devices and different locations. Consequently, the functions may be implemented by one or more computing devices, with the various functionality described above distributed in various ways across the different computing devices, to collectively implement the payment processing system 700. In examples where the payment processing system 700 includes multiple payment processing systems 700, the multiple payment processing systems 700 may be located together or separately, and organized, for example, as virtual servers, server banks and/or server farms. The described functionality may be provided by the servers of a single entity or enterprise, or may be provided by the servers and/or services of multiple different buyers or enterprises.

In the example of FIG. 7, the payment processing system 700 may include one or more processors 702, one or more memory devices 704, one or more communication interfaces 708, and/or one or more input/output devices 710. These components may be similar to those described above with reference to FIG. 1 and elsewhere herein.

The memory 704 may be used to store and maintain any number of functional components or applications that are executable by the processor 702. In examples, these functional components comprise instructions or programs that are executable by the processor 702 and that, when executed, implement operational logic for performing the actions and services attributed above to the payment processing system 700. Functional components of the payment processing system 700 stored in the memory 704 may include the payment processing application 706, the operating system 712, and other applications and data 714. These components may be similar to those described with reference to FIG. 1 and elsewhere herein. In addition, the memory 704 may store data used for performing the operations described herein. Thus, the memory 704 may store merchant information 716, including merchant profiles and/or accounts, and/or user information 718, including user profiles and/or accounts. Further, the payment processing system 700 may include other logical, programmatic and physical components, of which those described above are merely examples that are related to the discussion herein.

FIG. 8 depicts components of a merchant terminal operating-system stack 802 and components of a customer terminal operating-system stack 804.

With respect to the merchant terminal operating system (OS) stack 802, the OS stack 802 may be stored on or with respect to non-transitory computer-readable media. The stack 802 may include "layers" of application programs 806, libraries and/or utilities 808, and an operating system 810, for example. Additional, or alternative, layers may also be present. The application programs layer 806 may include one or more applications that may perform one or more of the optimized message sizing and/or serialization techniques described herein.

For example, the application programs layer 806 may include applications such as a state machine 812, one or more protocol buffers 814, a point-of-sale application 816, a message sizing application 818, and/or an applet switcher 820. The state machine 812 may determine the state of the merchant terminal and/or the customer terminal and/or may control the switching between states. The one or more protocol buffers 814 may be utilized to serialize messages sent from the merchant terminal to the customer terminal, for example. Serialization of messages using protocol buffers is described in more detail below with respect to FIG. 13.

The point-of-sale application 816 may provide functionality that may allow a merchant to initiate and complete a transaction with a buyer as described above with respect to FIG. 1. The message sizing application 818 may provide functionality that may allow for optimization of message sizes for messages sent by the merchant terminal to the customer terminal and/or to a remote system as described in more detail with respect to FIG. 12, below. The applet switcher 820 may provide functionality that may allow for switching between applications, for example, depending on the state of the merchant terminal as determined by the state machine 812.

The libraries and/or utilities layer 808 may include, for example, functionality that may allow system calls to be wrapped in a format for specific programming languages. The libraries may also overcome cross-platform communication issues by providing a uniform platform for internal application calls and a range of calls from other operating systems. The operating system layer 810 may include, for example, functionality that may include managing resources and providing services for software that runs in the application programs layer 806.

With respect to the customer terminal operating system (OS) stack 804, the OS stack 804 may be stored on or with respect to non-transitory computer-readable media. The stack 804 may include "layers" of application programs 822, libraries and/or utilities 824, and an operating system 826, for example. Additional, or alternative, layers may also be present. The application programs layer 822 may include one or more applications that may perform one or more of the optimized message sizing and/or serialization techniques described herein.

For example, the application programs layer 822 may include applications such as a state machine 828, one or more protocol buffers 830, a message sizing application 832, an applet switcher 834, an accessibility application 836, and/or a secure payment enclave 838. The state machine 828 may determine the state of the customer terminal and/or the merchant terminal and/or may control the switching between states. The one or more protocol buffers 830 may be utilized to serialize messages sent from the customer terminal to the merchant terminal and/or from the secure payment enclave to other components of the customer terminal, for example. Serialization of messages using protocol buffers is described in more detail below with respect to FIG. 13.

The message sizing application 832 may provide functionality that may allow for optimization of message sizes for messages sent by the customer terminal to the merchant terminal and/or from the secure payment enclave to other components of the customer terminal as described in more detail with respect to FIG. 12, below. The applet switcher 834 may provide functionality that may allow for switching between applications, for example, depending on the state of the customer terminal as determined by the state machine 828.

The accessibility application 836 may provide functionality that may allow the customer terminal to determine accessibility of the merchant terminal and/or the remote system and/or the payment-object reader. The secure payment enclave 838 may accept payment object information from payment objects read by the payment-object reader. The secure payment enclave 838 may also store such payment object information and may optimize message sizing and serialization before sending messages to other components of the customer terminal and/or the merchant terminal, as described herein.

The libraries and/or utilities layer 824 may include, for example, functionality that may allow system calls to be wrapped in a format for specific programming languages. The libraries may also overcome cross-platform communication issues by providing a uniform platform for internal application calls and a range of calls from other operating systems. The operating system layer 826 may include, for example, functionality that may include managing resources and providing services for software that runs in the application programs layer 822.

All or some of the techniques, data, and information described above may be utilized for optimizing message sizing and/or serialization across multiple terminals that include their own operating-system stacks.

FIGS. 9-13 illustrate various processes for optimizing message sizing and message serialization. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-8, although the processes may be implemented in a wide variety of other environments, architectures and systems.

Figure 9:
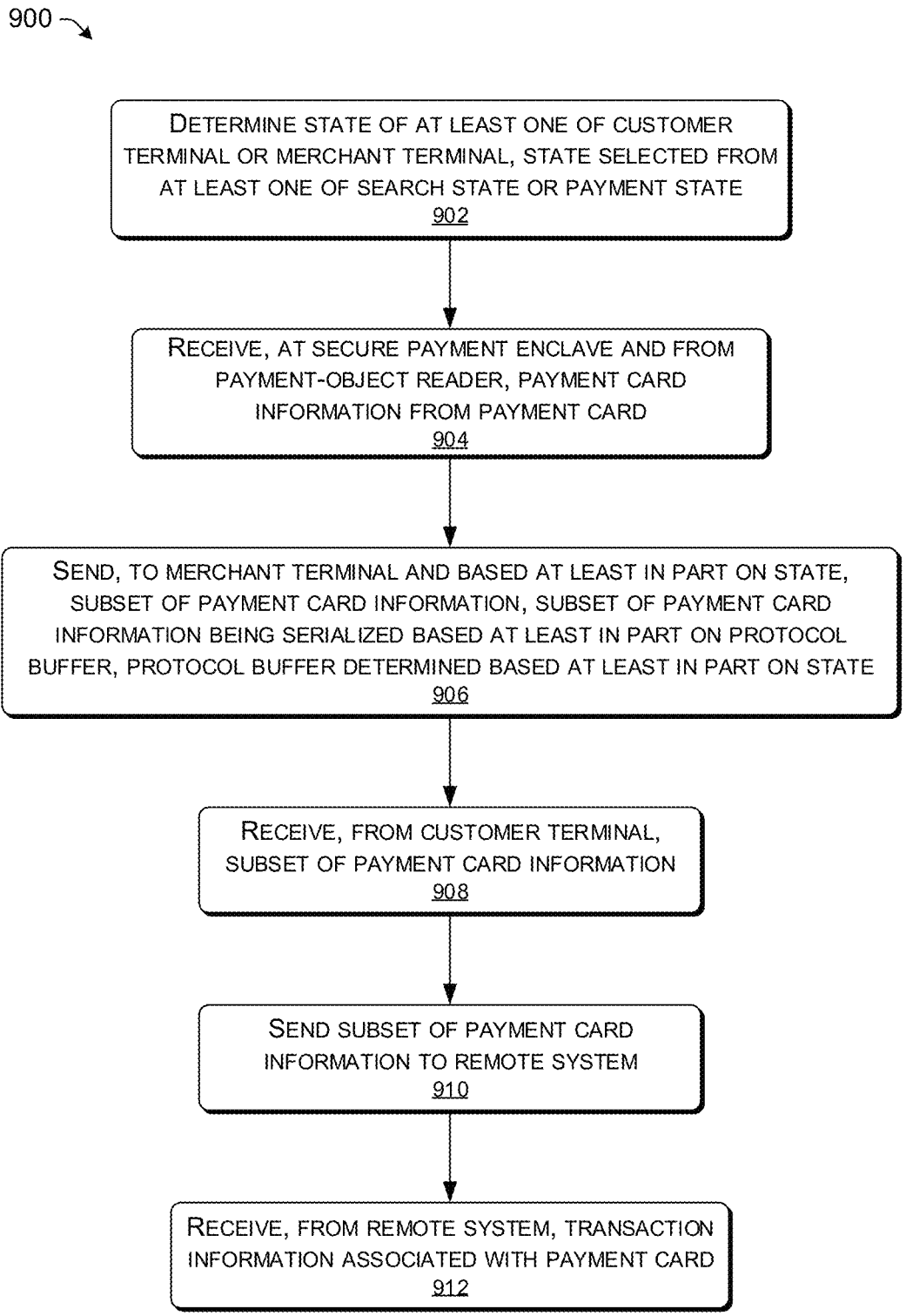
FIG. 9 depicts a non-limiting flow diagram illustrating a process for message sizing and serialization optimization.

FIG. 9 depicts a non-limiting flow diagram illustrating a process 900 for optimizing message sizing and message serialization.

At block 902, the process 900 may include determining a state of at least one of a customer terminal or a merchant terminal. The state may be selected from at least a search state and/or a payment state. Additional, or alternative, states may include, for example, a transaction-history state, a name state, a refund state, and/or an idle state. The state may be determined based at least in part on input received at the customer terminal and/or input received at the merchant terminal. The input may be received from a user of the customer terminal and/or the merchant terminal. Additionally, or alternatively, the input may be received from memory stored on the customer terminal and/or the merchant terminal and/or a remote system in communication with the customer terminal and/or the merchant terminal.

By way of example, if a merchant terminal receives an indication that a previously-unpurchased item has been scanned by a component of the POS system, the merchant terminal and/or the customer terminal may enter a payment state. By way of further example, if a merchant terminal receives an indication that a previously-purchased item has been scanned by a component of the POS system, the merchant terminal and/or the customer terminal may enter a refund state. By way of further example, if the merchant terminal receives an indication that a ticket, such as a ticket corresponding to a food order, for example, is to be generated, the merchant terminal and/or the customer terminal may enter a name state. By way of further example, if the merchant terminal and/or the customer terminal receives an indication that the payment card reader has received payment object information without an indication that the payment object information is to be utilized to complete a transaction and/or to process a refund, the merchant terminal and/or the customer terminal may enter a transaction-history state. In addition, or alternatively, the state of the merchant terminal and/or the customer terminal may be determined by the user of the customer terminal and/or the merchant terminal.

At block 904, the process 900 may include receiving, via a secure payment enclave, payment card information from a payment card. The secure payment enclave may be associated with a payment-object reader, which may read payment object information by, for example, accepting a payment object that has been swiped into the payment-object reader, accepting a payment object that has been dipped into the payment-object reader, and/or accepting a payment object that has been tapped or brought into close proximity to a NFC component of the payment-object reader. In examples, the payment-object reader may be a component of the customer terminal, and in these examples, the secure payment enclave may be a component of the customer terminal. In other examples, the payment-object reader may be separate component from the customer terminal. In these examples, the secure payment enclave may be stored on memory associated with the customer terminal and/or on memory associated with the separated payment-object reader.

The payment card information may include, for example, a payment card identifier, such as a credit card number, debit card number, hash value, or other identifier of the payment card. The payment card information may also include, for example, a name or naming indicator corresponding to a person authorized to use the payment card. The payment information may also include, for example, an expiration data associated with the payment card. The payment card information may also include, for example, contact information associated with the payment card. The payment card information may also include, for example, address information associated with the payment card. Obtaining one or more of the types of information described above may be based at least in part on a customer providing permission to obtain such information from the payment card.

At block 906, the process 900 may include sending, to the merchant terminal and based at least in part on the state, a subset of the payment card information. The subset of the payment card information may be serialized based at least in part on a protocol buffer. The protocol buffer may be determined based at least in part on the state. Determining the subset of the payment card information to send from the customer terminal to the merchant terminal is described in more detail with respect to FIG. 12, below.

By way of example, where the state corresponds to the search state, the customer terminal may identify a payment card identifier from the payment card information. Message data may be generated that includes the subset of the payment card information, including the payment card identifier. By way of further example, where the state corresponds to the search state, the customer terminal may identify a name or name indicator of a person associated with the payment card from the payment card information. Message data may be generated that includes the subset of the payment card information, including the name or name indicator.

Figure 13:
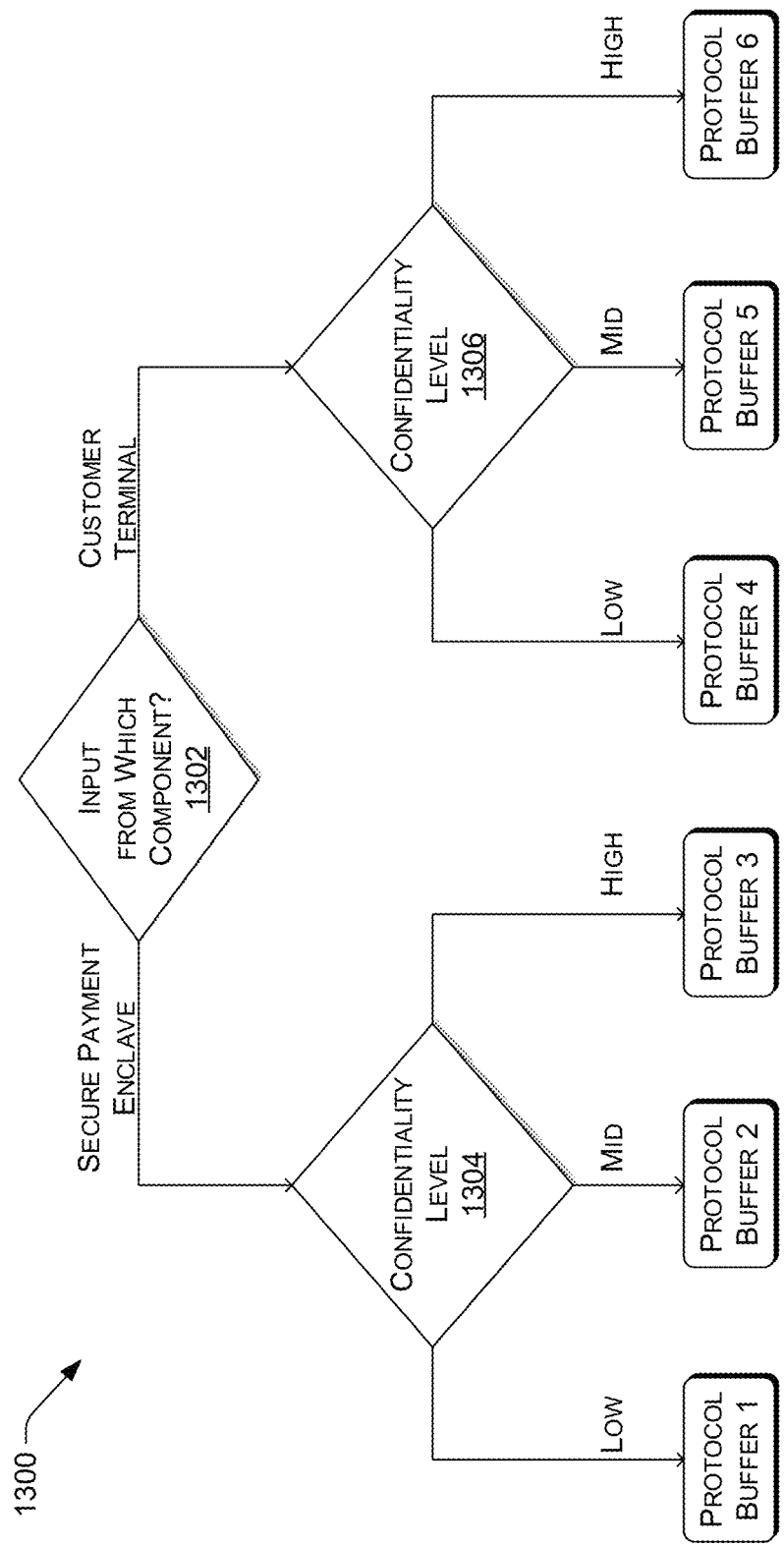
FIG. 13 depicts a non-limiting flow diagram illustrating message serialization optimization depending on a state of a POS system.

Serialization of the payment card information may be performed as described with respect to FIG. 13. For example, the serialization process may include determining which application and/or device is sending information. For example, if a secure payment enclave is sending information, for example, to other components of a customer terminal a confidentiality level may be associated with the information being sent and/or a state that the customer terminal and/or the merchant terminal is in. As described herein, the customer terminal and/or the merchant terminal may be in one of a variety of states. Some or each of the states may correspond to a confidentiality level at which information passing between the components of a POS system is to be treated. The confidentiality levels may be measured or assigned using any number of metrics. By way of example, confidentiality levels of 1-3 may be employed, with each level corresponding to a different categorization of confidentiality. For example, a confidentiality level of 1 may correspond to information and/or a state that is nonconfidential, a confidentiality level of 2 may correspond to information and/or a state that is somewhat confidential, and a confidentiality level of 3 may correspond to information and/or a state that is highly confidential. The customer, the merchant, and/or an operator or system of the remote system may set the various confidentiality levels and the types of information or states that correspond to each confidentiality level.

Where the customer terminal is sending information to the merchant terminal, the confidentiality level associated with the information and/or the state may be determined. In examples, the confidentiality level may match or differ from the confidentiality level determined when the secure payment enclave is sending information to other components of the customer terminal. Given that the payment-object reader and the other components of the customer terminal may be integral, even when the information sent between the secure payment enclave and the other components of the customer terminal are confidential, the nature of the communication makes nefarious access to the transmission difficult and therefore the confidentiality level may be less than a confidentiality level associated with the communication of the same information between the customer terminal and the merchant terminal.

Each confidentiality level may be associated with a protocol buffer for serialization of the information to be sent from the secure payment enclave to the other components of the customer terminal and/or the merchant terminal. Information sent from the secure payment enclave to other components of the customer terminal and having a low confidentiality level may be serialized using a first protocol buffer. Information sent from the secure payment enclave to other components of the customer terminal and having a mid confidentiality level may be serialized using a second protocol buffer. Information sent from the secure payment enclave to other components of the customer terminal and having a high confidentiality level may be serialized using a third protocol buffer. Information sent from the customer terminal to the merchant terminal and having a low confidentiality level may be serialized using a fourth protocol buffer. Information sent from the customer terminal to the merchant terminal and having a mid confidentiality level may be serialized using a fifth protocol buffer. Information sent from the customer terminal to the merchant terminal and having a high confidentiality level may be serialized using a sixth protocol buffer.

As used herein, protocol buffers refer to methods of serializing structured data, such as data to be sent via one or more wires between devices or components of devices. The methods include the use of an interface description language that may describe the data structure and one or more instructions that generate source code from the description of the data structure. By so doing, a stream of bytes may be generated or parsed that represent the structured data. The structured data to be utilized by the protocol buffers may be described as messages may be associated with a proto definition file and compiled with protoc. Messages may be serialized into a binary wire format, which may be forward compatible and/or backward compatible. The devices and/or components of devices that messages are sent to and/or from may include instructions, stored in memory, that authorizes communication between devices and/or device components via the protocol buffers described herein.

The various protocol buffers described herein and their relationships to the information being sent, device states, and/or confidentiality levels may differ with respect to, for example, annotation of declarations in the .proto file associated with each protocol buffer. The declaration annotation may, for example, be amended for code generation and parsing speech, code size, and runtime library usage. Protocol buffers associated with, for example, low confidentiality levels may have declaration annotations that increase the speed of compilation and/or parsing, have smaller code size, and use the "lite" runtime library. Protocol buffers associated with, for example, high confidentiality levels may have declaration annotations that reduce the speed of compilation and/or parsing, have larger code size, and use a full runtime library. Additionally, or alternatively, one or more custom options may be generated and/or utilized for declaration amendments to the .proto file. These options may be customized to generate serialized data that is more difficult to access for highly confidential information and/or high confidentiality levels.

While message communication has been described herein as being between a secure payment enclave and other components of a customer terminal and/or between a customer terminal and a merchant terminal, it should be understood that messages may be communicated between POS systems as well, or alternatively. Message sizing and serialization optimization may be performed for such communications between POS systems.

At block 908, the process 900 may include receiving, from the customer terminal and at the merchant terminal, the subset of the payment card information. The subset of the payment card information may be deserialized after received at the merchant terminal. Deserialization may include generation of deserialized code and/or parsing of the serialized code, such as by the merchant terminal. The subset of the payment card information may be serialized as described above with respect to block 906.

At block 910, the process 900 may include sending the subset of the payment card information to a remote system. Communication between the merchant terminal and the remote system may be via wired or wireless communication and using the network interfaces describes herein.

At block 912, the process 900 may include receiving, from the remote system, transaction information associated with the payment card. The transaction information may include, for example, one or more transactions associated with the payment card, and/or information associated with goods and/or services purchased using the payment card, and/or a summary of the transactions associated with the payment card, dates and/or times and/or locations and/or merchants that the payment card has been used in connection with, and/or customer data associated with the payment card such as loyalty program information, contact information, and/or customer feedback, for example. The transaction information and/or a portion or an indication thereof may be sent from the merchant terminal to the customer terminal.

Figure 10:
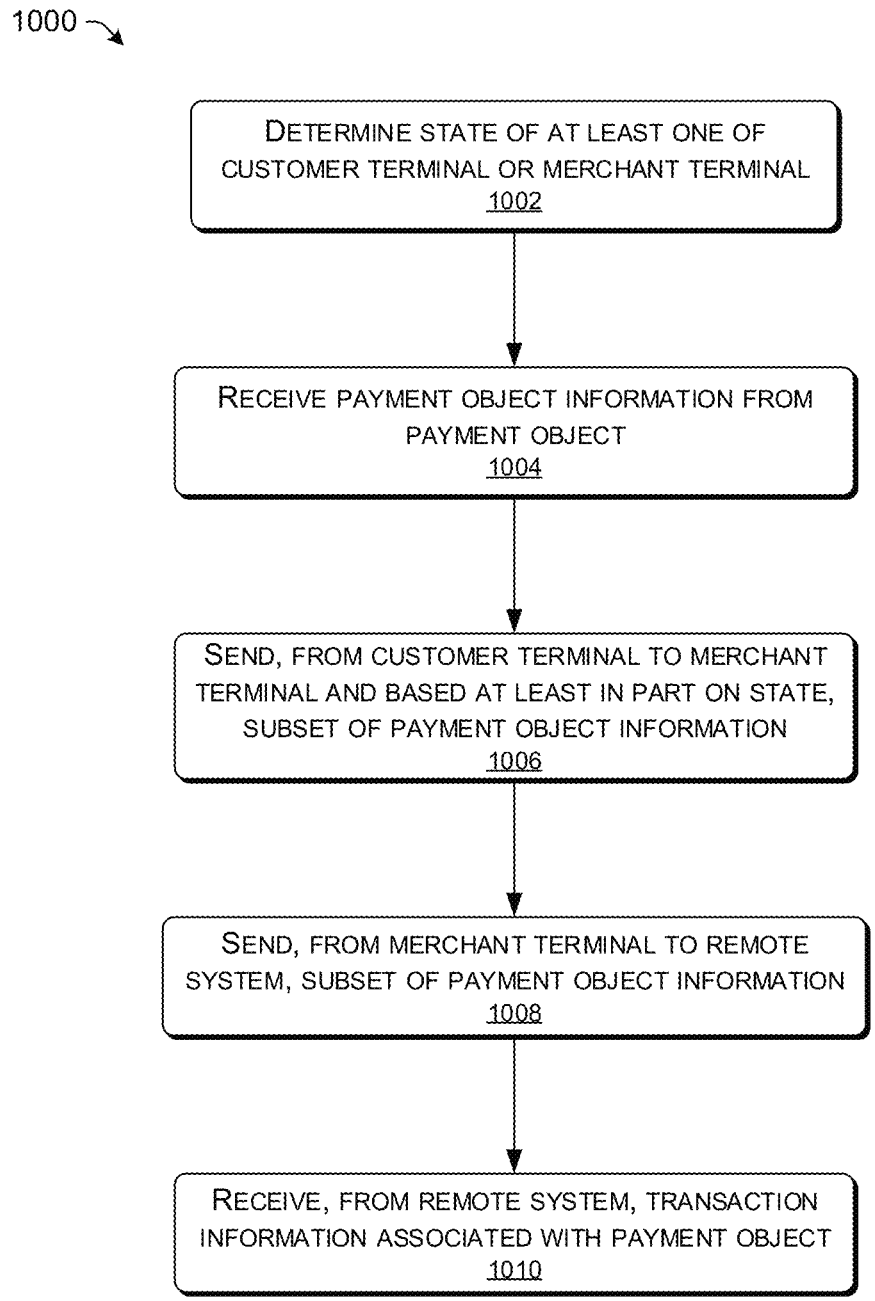
FIG. 10 depicts a non-limiting flow diagram illustrating a process for message sizing optimization.

FIG. 10 depicts a non-limiting flow diagram illustrating a process 1000 for message sizing optimization.

At block 1002, the process 1000 may include determining a state of at least one of a customer terminal or a merchant terminal. The state may be selected from at least a search state and/or a payment state. Additional, or alternative, states may include, for example, a transaction-history state, a name state, a refund state, and/or an idle state. The state may be determined based at least in part on input received at the customer terminal and/or input received at the merchant terminal. The input may be received from a user of the customer terminal and/or the merchant terminal. Additionally, or alternatively, the input may be received from memory stored on the customer terminal and/or the merchant terminal and/or a remote system in communication with the customer terminal and/or the merchant terminal.

By way of example, if a merchant terminal receives an indication that a previously-unpurchased item has been scanned by a component of the POS system, the merchant terminal and/or the customer terminal may enter a payment state. By way of further example, if a merchant terminal receives an indication that a previously-purchased item has been scanned by a component of the POS system, the merchant terminal and/or the customer terminal may enter a refund state. By way of further example, if the merchant terminal receives an indication that a ticket, such as a ticket corresponding to a food order, for example, is to be generated, the merchant terminal and/or the customer terminal may enter a name state. By way of further example, if the merchant terminal and/or the customer terminal receives an indication that the payment card reader has received payment object information without an indication that the payment object information is to be utilized to complete a transaction and/or to process a refund, the merchant terminal and/or the customer terminal may enter a transaction-history state. In addition, or alternatively, the state of the merchant terminal and/or the customer terminal may be determined by the user of the customer terminal and/or the merchant terminal.

At block 1004, the process 1000 may include receiving, via a secure payment enclave, payment card information from a payment card. The secure payment enclave may be associated with a payment-object reader, which may read payment object information by, for example, accepting a payment object that has been swiped into the payment-object reader, accepting a payment object that has been dipped into the payment-object reader, and/or accepting a payment object that has been tapped or brought into close proximity to a NFC component of the payment-object reader. In examples, the payment-object reader may be a component of the customer terminal, and in these examples, the secure payment enclave may be a component of the customer terminal. In other examples, the payment-object reader may be separate component from the customer terminal. In these examples, the secure payment enclave may be stored on memory associated with the customer terminal and/or on memory associated with the separated payment-object reader.

The payment object information may include, for example, a payment object identifier, such as a credit card number, debit card number, hash value, or other identifier of the payment object. The payment object information may also include, for example, a name or naming indicator corresponding to a person authorized to use the payment object. The payment object information may also include, for example, an expiration data associated with the payment object. The payment object information may also include, for example, contact information associated with the payment object. The payment object information may also include, for example, address information associated with the payment object. Obtaining one or more of the types of information described above may be based at least in part on a customer providing permission to obtain such information from the payment object.

At block 1006, the process 1000 may include sending, from the customer terminal to the merchant terminal, a subset of the payment object information. The subset of the payment object information may be identified and/or determined and/or selected based at least in part on the state of the customer terminal and/or the merchant terminal. Determining the subset of the payment object information to send from the customer terminal to the merchant terminal is described in more detail with respect to FIG. 12, below.

By way of example, where the state corresponds to the search state, the customer terminal may identify a payment object identifier from the payment object information. Message data may be generated that includes the subset of the payment object information, including the payment object identifier. By way of further example, where the state corresponds to the search state, the customer terminal may identify a name or name indicator of a person associated with the payment object from the payment object information. Message data may be generated that includes the subset of the payment object information, including the name or name indicator.

At block 1008, the process 1000 may include sending, from the merchant terminal and to a remote system, the subset of the payment object information. Communication between the merchant terminal and the remote system may be via wired or wireless communication and using the network interfaces describes herein.

At block 1010, the process 1000 may include receiving, from the remote system, transaction information associated with the payment object. The transaction information may include, for example, one or more transactions associated with the payment object, and/or information associated with goods and/or services purchased using the payment object, and/or a summary of the transactions associated with the payment object, dates and/or times and/or locations and/or merchants that the payment object has been used in connection with, and/or customer data associated with the payment object such as loyalty program information, contact information, and/or customer feedback, for example. The transaction information and/or a portion or an indication thereof may be sent from the merchant terminal to the customer terminal.

The process 1000 may additionally include serializing the payment object information, or a portion thereof, based at least in part on a protocol buffer. The protocol buffer may be identified and/or determined and/or selected based at least in part on the state of the customer terminal and/or the merchant terminal. Serialization of the payment card information may be performed as described with respect to FIG. 13. For example, the serialization process may include determining which application and/or device is sending information. For example, if a secure payment enclave is sending information, for example, to other components of a customer terminal a confidentiality level may be associated with the information being sent and/or a state that the customer terminal and/or the merchant terminal is in. As described herein, the customer terminal and/or the merchant terminal may be in one of a variety of states. Some or each of the states may correspond to a confidentiality level at which information passing between the components of a POS system is to be treated. The confidentiality levels may be measured or assigned using any number of metrics.

By way of example, confidentiality levels of 1-3 may be employed, with each level corresponding to a different categorization of confidentiality. For example, a confidentiality level of 1 may correspond to information and/or a state that is nonconfidential, a confidentiality level of 2 may correspond to information and/or a state that is somewhat confidential, and a confidentiality level of 3 may correspond to information and/or a state that is highly confidential. The customer, the merchant, and/or an operator or system of the remote system may set the various confidentiality levels and the types of information or states that correspond to each confidentiality level.

Where the customer terminal is sending information to the merchant terminal, the confidentiality level associated with the information and/or the state may be determined. In examples, the confidentiality level may match or differ from the confidentiality level determined when the secure payment enclave is sending information to other components of the customer terminal. Given that the payment-object reader and the other components of the customer terminal may be integral, even when the information sent between the secure payment enclave and the other components of the customer terminal are confidential, the nature of the communication makes nefarious access to the transmission difficult and therefore the confidentiality level may be less than a confidentiality level associated with the communication of the same information between the customer terminal and the merchant terminal.

Each confidentiality level may be associated with a protocol buffer for serialization of the information to be sent from the secure payment enclave to the other components of the customer terminal and/or the merchant terminal. Information sent from the secure payment enclave to other components of the customer terminal and having a low confidentiality level may be serialized using a first protocol buffer. Information sent from the secure payment enclave to other components of the customer terminal and having a mid confidentiality level may be serialized using a second protocol buffer. Information sent from the secure payment enclave to other components of the customer terminal and having a high confidentiality level may be serialized using a third protocol buffer. Information sent from the customer terminal to the merchant terminal and having a low confidentiality level may be serialized using a fourth protocol buffer. Information sent from the customer terminal to the merchant terminal and having a mid confidentiality level may be serialized using a fifth protocol buffer. Information sent from the customer terminal to the merchant terminal and having a high confidentiality level may be serialized using a sixth protocol buffer.

As used herein, protocol buffers refer to methods of serializing structured data, such as data to be sent via one or more wires between devices or components of devices. The methods include the use of an interface description language that may describe the data structure and one or more instructions that generate source code from the description of the data structure. By so doing, a stream of bytes may be generated or parsed that represent the structured data. The structured data to be utilized by the protocol buffers may be described as messages may be associated with a proto definition file and compiled with protoc. Messages may be serialized into a binary wire format, which may be forward compatible and/or backward compatible. The devices and/or components of devices that messages are sent to and/or from may include instructions, stored in memory, that authorizes communication between devices and/or device components via the protocol buffers described herein.

The various protocol buffers described herein and their relationships to the information being sent, device states, and/or confidentiality levels may differ with respect to, for example, annotation of declarations in the .proto file associated with each protocol buffer. The declaration annotation may, for example, be amended for code generation and parsing speech, code size, and runtime library usage. Protocol buffers associated with, for example, low confidentiality levels may have declaration annotations that increase the speed of compilation and/or parsing, have smaller code size, and use the "lite" runtime library. Protocol buffers associated with, for example, high confidentiality levels may have declaration annotations that reduce the speed of compilation and/or parsing, have larger code size, and use a full runtime library. Additionally, or alternatively, one or more custom options may be generated and/or utilized for declaration amendments to the .proto file. These options may be customized to generate serialized data that is more difficult to access for highly confidential information and/or high confidentiality levels.

While message communication has been described herein as being between a secure payment enclave and other components of a customer terminal and/or between a customer terminal and a merchant terminal, it should be understood that messages may be communicated between POS systems as well, or alternatively. Message sizing and serialization optimization may be performed for such communications between POS systems.

The process 1000 may additionally include performing some or all of the operations described with respect to process 1000 across two operating-system stacks. The customer terminal may include a first operating-system stack and the merchant terminal may include a second operating-system stack. With respect to the merchant terminal operating system (OS) stack, the OS stack may be stored on or with respect to non-transitory computer-readable media. The stack may include "layers" of application programs, libraries and/or utilities, and an operating system, for example. Additional, or alternative, layers may also be present. The application programs layer may include one or more applications that may perform one or more of the optimized message sizing and/or serialization techniques described herein.

For example, the application programs layer may include applications such as a state machine, one or more protocol buffers, a point-of-sale application, a message sizing application, and/or an applet switcher. The state machine may determine the state of the merchant terminal and/or the customer terminal and/or may control the switching between states. The one or more protocol buffers may be utilized to serialize messages sent from the merchant terminal to the customer terminal, for example. Serialization of messages using protocol buffers is described in more detail below with respect to FIG. 13.

The point-of-sale application may provide functionality that may allow a merchant to initiate and complete a transaction with a buyer as described above with respect to FIG. 1. The message sizing application may provide functionality that may allow for optimization of message sizes for messages sent by the merchant terminal to the customer terminal and/or to a remote system as described in more detail with respect to FIG. 12, below. The applet switcher may provide functionality that may allow for switching between applications, for example, depending on the state of the merchant terminal as determined by the state machine.

The libraries and/or utilities layer may include, for example, functionality that may allow system calls to be wrapped in a format for specific programming languages. The libraries may also overcome cross-platform communication issues by providing a uniform platform for internal application calls and a range of calls from other operating systems. The operating system layer may include, for example, functionality that may include managing resources and providing services for software that runs in the application programs layer.

With respect to the customer terminal operating system (OS) stack, the OS stack may be stored on or with respect to non-transitory computer-readable media. The stack may include "layers" of application programs, libraries and/or utilities, and an operating system, for example. Additional, or alternative, layers may also be present. The application programs layer may include one or more applications that may perform one or more of the optimized message sizing and/or serialization techniques described herein.

For example, the application programs layer may include applications such as a state machine, one or more protocol buffers, a message sizing application, an applet switcher, an accessibility application, and/or a secure payment enclave. The state machine may determine the state of the customer terminal and/or the merchant terminal and/or may control the switching between states. The one or more protocol buffers may be utilized to serialize messages sent from the customer terminal to the merchant terminal and/or from the secure payment enclave to other components of the customer terminal, for example. Serialization of messages using protocol buffers is described in more detail below with respect to FIG. 13.

The message sizing application may provide functionality that may allow for optimization of message sizes for messages sent by the customer terminal to the merchant terminal and/or from the secure payment enclave to other components of the customer terminal as described in more detail with respect to FIG. 12, below. The applet switcher may provide functionality that may allow for switching between applications, for example, depending on the state of the customer terminal as determined by the state machine.

The accessibility application may provide functionality that may allow the customer terminal to determine accessibility of the merchant terminal and/or the remote system and/or the payment-object reader. The secure payment enclave may accept payment object information from payment objects read by the payment-object reader. The secure payment enclave may also store such payment object information and may optimize message sizing and serialization before sending messages to other components of the customer terminal and/or the merchant terminal, as described herein.

The libraries and/or utilities layer may include, for example, functionality that may allow system calls to be wrapped in a format for specific programming languages. The libraries may also overcome cross-platform communication issues by providing a uniform platform for internal application calls and a range of calls from other operating systems. The operating system layer may include, for example, functionality that may include managing resources and providing services for software that runs in the application programs layer.

Figure 11:
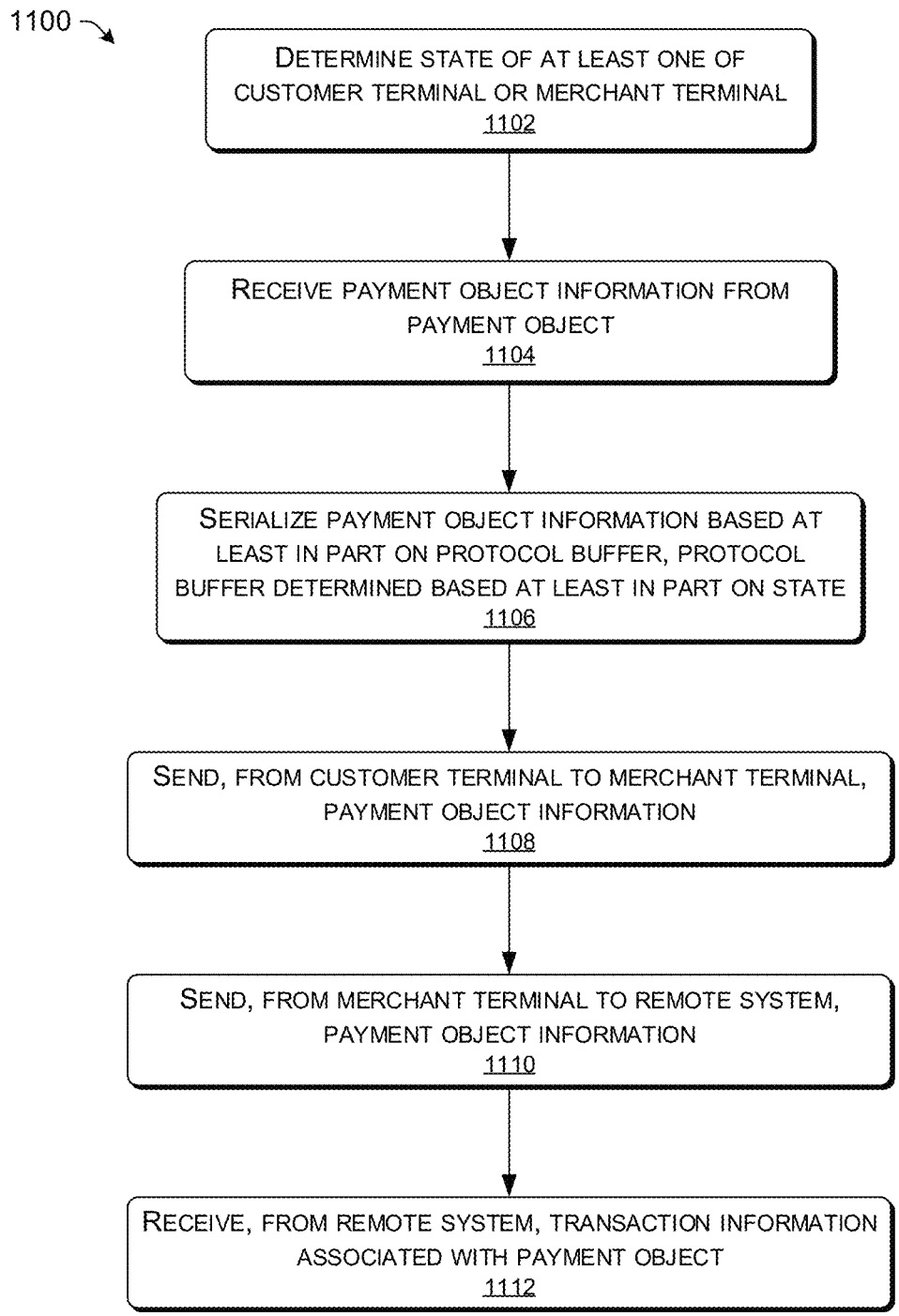
FIG. 11 depicts a non-limiting flow diagram illustrating a process for message serialization optimization.

FIG. 11 depicts a non-limiting flow diagram illustrating a process 1100 for message serialization optimization.

At block 1102, the process 1100 may include determining a state of at least one of a customer terminal or a merchant terminal. The state may be selected from at least a search state and/or a payment state. Additional, or alternative, states may include, for example, a transaction-history state, a name state, a refund state, and/or an idle state. The state may be determined based at least in part on input received at the customer terminal and/or input received at the merchant terminal. The input may be received from a user of the customer terminal and/or the merchant terminal. Additionally, or alternatively, the input may be received from memory stored on the customer terminal and/or the merchant terminal and/or a remote system in communication with the customer terminal and/or the merchant terminal.

By way of example, if a merchant terminal receives an indication that a previously-unpurchased item has been scanned by a component of the POS system, the merchant terminal and/or the customer terminal may enter a payment state. By way of further example, if a merchant terminal receives an indication that a previously-purchased item has been scanned by a component of the POS system, the merchant terminal and/or the customer terminal may enter a refund state. By way of further example, if the merchant terminal receives an indication that a ticket, such as a ticket corresponding to a food order, for example, is to be generated, the merchant terminal and/or the customer terminal may enter a name state. By way of further example, if the merchant terminal and/or the customer terminal receives an indication that the payment card reader has received payment object information without an indication that the payment object information is to be utilized to complete a transaction and/or to process a refund, the merchant terminal and/or the customer terminal may enter a transaction-history state. In addition, or alternatively, the state of the merchant terminal and/or the customer terminal may be determined by the user of the customer terminal and/or the merchant terminal.

At block 1104, the process 1100 may include receiving, at a secure payment enclave, payment object information from a payment object. The secure payment enclave may be associated with a payment-object reader, which may read payment object information by, for example, accepting a payment object that has been swiped into the payment-object reader, accepting a payment object that has been dipped into the payment-object reader, and/or accepting a payment object that has been tapped or brought into close proximity to a NFC component of the payment-object reader. In examples, the payment-object reader may be a component of the customer terminal, and in these examples, the secure payment enclave may be a component of the customer terminal. In other examples, the payment-object reader may be separate component from the customer terminal. In these examples, the secure payment enclave may be stored on memory associated with the customer terminal and/or on memory associated with the separated payment-object reader.

The payment object information may include, for example, a payment object identifier, such as a credit card number, debit card number, hash value, or other identifier of the payment object. The payment object information may also include, for example, a name or naming indicator corresponding to a person authorized to use the payment object. The payment object information may also include, for example, an expiration data associated with the payment object. The payment object information may also include, for example, contact information associated with the payment object. The payment object information may also include, for example, address information associated with the payment object. Obtaining one or more of the types of information described above may be based at least in part on a customer providing permission to obtain such information from the payment object.

At block 1106, the process 1100 may include serializing the payment object information, or a portion thereof, based at least in part on a protocol buffer. The protocol buffer may be identified and/or determined and/or selected based at least in part on the state of the customer terminal and/or the merchant terminal.

By way of example, where the state corresponds to the search state, the customer terminal may select a protocol buffer from multiple protocol buffers based at least in part on the state corresponding to the search state. Additionally, a payment object identifier may be identified from the payment object information. Serializing the payment object information may include serializing the payment object identifier via the selected protocol buffer. By way of further example, where the state corresponds to the search state, the customer terminal may select a protocol buffer from multiple protocol buffers based at least in part on the state corresponding to the search state. Additionally, a name or name indicator may be identified from the payment object information. Serializing the payment object information may include serializing the name or name indicator via the selected protocol buffer.

Serialization of the payment card information may be performed as described with respect to FIG. 13. For example, the serialization process may include determining which application and/or device is sending information. For example, if a secure payment enclave is sending information, for example, to other components of a customer terminal a confidentiality level may be associated with the information being sent and/or a state that the customer terminal and/or the merchant terminal is in. As described herein, the customer terminal and/or the merchant terminal may be in one of a variety of states. Some or each of the states may correspond to a confidentiality level at which information passing between the components of a POS system is to be treated. The confidentiality levels may be measured or assigned using any number of metrics.

By way of example, confidentiality levels of 1-3 may be employed, with each level corresponding to a different categorization of confidentiality. For example, a confidentiality level of 1 may correspond to information and/or a state that is nonconfidential, a confidentiality level of 2 may correspond to information and/or a state that is somewhat confidential, and a confidentiality level of 3 may correspond to information and/or a state that is highly confidential. The customer, the merchant, and/or an operator or system of the remote system may set the various confidentiality levels and the types of information or states that correspond to each confidentiality level.

Where the customer terminal is sending information to the merchant terminal, the confidentiality level associated with the information and/or the state may be determined. In examples, the confidentiality level may match or differ from the confidentiality level determined when the secure payment enclave is sending information to other components of the customer terminal. Given that the payment-object reader and the other components of the customer terminal may be integral, even when the information sent between the secure payment enclave and the other components of the customer terminal are confidential, the nature of the communication makes nefarious access to the transmission difficult and therefore the confidentiality level may be less than a confidentiality level associated with the communication of the same information between the customer terminal and the merchant terminal.

Each confidentiality level may be associated with a protocol buffer for serialization of the information to be sent from the secure payment enclave to the other components of the customer terminal and/or the merchant terminal. Information sent from the secure payment enclave to other components of the customer terminal and having a low confidentiality level may be serialized using a first protocol buffer. Information sent from the secure payment enclave to other components of the customer terminal and having a mid confidentiality level may be serialized using a second protocol buffer. Information sent from the secure payment enclave to other components of the customer terminal and having a high confidentiality level may be serialized using a third protocol buffer. Information sent from the customer terminal to the merchant terminal and having a low confidentiality level may be serialized using a fourth protocol buffer. Information sent from the customer terminal to the merchant terminal and having a mid confidentiality level may be serialized using a fifth protocol buffer. Information sent from the customer terminal to the merchant terminal and having a high confidentiality level may be serialized using a sixth protocol buffer.

As used herein, protocol buffers refer to methods of serializing structured data, such as data to be sent via one or more wires between devices or components of devices. The methods include the use of an interface description language that may describe the data structure and one or more instructions that generate source code from the description of the data structure. By so doing, a stream of bytes may be generated or parsed that represent the structured data. The structured data to be utilized by the protocol buffers may be described as messages may be associated with a proto definition file and compiled with protoc. Messages may be serialized into a binary wire format, which may be forward compatible and/or backward compatible. The devices and/or components of devices that messages are sent to and/or from may include instructions, stored in memory, that authorizes communication between devices and/or device components via the protocol buffers described herein.

The various protocol buffers described herein and their relationships to the information being sent, device states, and/or confidentiality levels may differ with respect to, for example, annotation of declarations in the .proto file associated with each protocol buffer. The declaration annotation may, for example, be amended for code generation and parsing speech, code size, and runtime library usage. Protocol buffers associated with, for example, low confidentiality levels may have declaration annotations that increase the speed of compilation and/or parsing, have smaller code size, and use the "lite" runtime library. Protocol buffers associated with, for example, high confidentiality levels may have declaration annotations that reduce the speed of compilation and/or parsing, have larger code size, and use a full runtime library. Additionally, or alternatively, one or more custom options may be generated and/or utilized for declaration amendments to the .proto file. These options may be customized to generate serialized data that is more difficult to access for highly confidential information and/or high confidentiality levels.

While message communication has been described herein as being between a secure payment enclave and other components of a customer terminal and/or between a customer terminal and a merchant terminal, it should be understood that messages may be communicated between POS systems as well, or alternatively. Message sizing and serialization optimization may be performed for such communications between POS systems.

At block 1108, the process 1100 may include sending, from the customer terminal and to the merchant terminal, the payment object information, or a portion thereof. The payment object information may be serialized before being sent from the customer terminal to the merchant terminal as described above with respect to block 1106.

At block 1110, the process 1100 may include sending, from the merchant terminal and to a remote system, the payment object information, or a portion thereof. Communication between the merchant terminal and the remote system may be via wired or wireless communication and using the network interfaces describes herein.

At block 1112, the process 1100 may include receiving, from the remote system, transaction information associated with the payment object. The transaction information may include, for example, one or more transactions associated with the payment object, and/or information associated with goods and/or services purchased using the payment object, and/or a summary of the transactions associated with the payment object, dates and/or times and/or locations and/or merchants that the payment object has been used in connection with, and/or customer data associated with the payment object such as loyalty program information, contact information, and/or customer feedback, for example. The transaction information and/or a portion or an indication thereof may be sent from the merchant terminal to the customer terminal.

The process 1100 may additionally include sending a subset of the payment object information from the secure payment enclave to other components of the customer terminal and/or from the customer terminal to the merchant terminal. The subset of the payment object information may be identified and/or determined and/or selected based at least in part on the state of the customer terminal and/or the merchant terminal. Determining the subset of the payment object information to send from the customer terminal to the merchant terminal is described in more detail with respect to FIG. 12, below.

By way of example, where the state corresponds to the search state, the customer terminal may identify a payment object identifier from the payment object information. Message data may be generated that includes the subset of the payment object information, including the payment object identifier. By way of further example, where the state corresponds to the search state, the customer terminal may identify a name or name indicator of a person associated with the payment object from the payment object information. Message data may be generated that includes the subset of the payment object information, including the name or name indicator.

The process 1100 may additionally include performing some or all of the operations described with respect to process 1100 across two operating-system stacks. The customer terminal may include a first operating-system stack and the merchant terminal may include a second operating-system stack. With respect to the merchant terminal operating system (OS) stack, the OS stack may be stored on or with respect to non-transitory computer-readable media. The stack may include "layers" of application programs, libraries and/or utilities, and an operating system, for example. Additional, or alternative, layers may also be present. The application programs layer may include one or more applications that may perform one or more of the optimized message sizing and/or serialization techniques described herein.

For example, the application programs layer may include applications such as a state machine, one or more protocol buffers, a point-of-sale application, a message sizing application, and/or an applet switcher. The state machine may determine the state of the merchant terminal and/or the customer terminal and/or may control the switching between states. The one or more protocol buffers may be utilized to serialize messages sent from the merchant terminal to the customer terminal, for example. Serialization of messages using protocol buffers is described in more detail below with respect to FIG. 13.

The point-of-sale application may provide functionality that may allow a merchant to initiate and complete a transaction with a buyer as described above with respect to FIG. 1. The message sizing application may provide functionality that may allow for optimization of message sizes for messages sent by the merchant terminal to the customer terminal and/or to a remote system as described in more detail with respect to FIG. 12, below. The applet switcher may provide functionality that may allow for switching between applications, for example, depending on the state of the merchant terminal as determined by the state machine.

The libraries and/or utilities layer may include, for example, functionality that may allow system calls to be wrapped in a format for specific programming languages. The libraries may also overcome cross-platform communication issues by providing a uniform platform for internal application calls and a range of calls from other operating systems. The operating system layer may include, for example, functionality that may include managing resources and providing services for software that runs in the application programs layer.

With respect to the customer terminal operating system (OS) stack, the OS stack may be stored on or with respect to non-transitory computer-readable media. The stack may include "layers" of application programs, libraries and/or utilities, and an operating system, for example. Additional, or alternative, layers may also be present. The application programs layer may include one or more applications that may perform one or more of the optimized message sizing and/or serialization techniques described herein.

For example, the application programs layer may include applications such as a state machine, one or more protocol buffers, a message sizing application, an applet switcher, an accessibility application, and/or a secure payment enclave. The state machine may determine the state of the customer terminal and/or the merchant terminal and/or may control the switching between states. The one or more protocol buffers may be utilized to serialize messages sent from the customer terminal to the merchant terminal and/or from the secure payment enclave to other components of the customer terminal, for example. Serialization of messages using protocol buffers is described in more detail below with respect to FIG. 13.

The message sizing application may provide functionality that may allow for optimization of message sizes for messages sent by the customer terminal to the merchant terminal and/or from the secure payment enclave to other components of the customer terminal as described in more detail with respect to FIG. 12, below. The applet switcher may provide functionality that may allow for switching between applications, for example, depending on the state of the customer terminal as determined by the state machine.

The accessibility application may provide functionality that may allow the customer terminal to determine accessibility of the merchant terminal and/or the remote system and/or the payment-object reader. The secure payment enclave may accept payment object information from payment objects read by the payment-object reader. The secure payment enclave may also store such payment object information and may optimize message sizing and serialization before sending messages to other components of the customer terminal and/or the merchant terminal, as described herein.

The libraries and/or utilities layer may include, for example, functionality that may allow system calls to be wrapped in a format for specific programming languages. The libraries may also overcome cross-platform communication issues by providing a uniform platform for internal application calls and a range of calls from other operating systems. The operating system layer may include, for example, functionality that may include managing resources and providing services for software that runs in the application programs layer.

Figure 12:
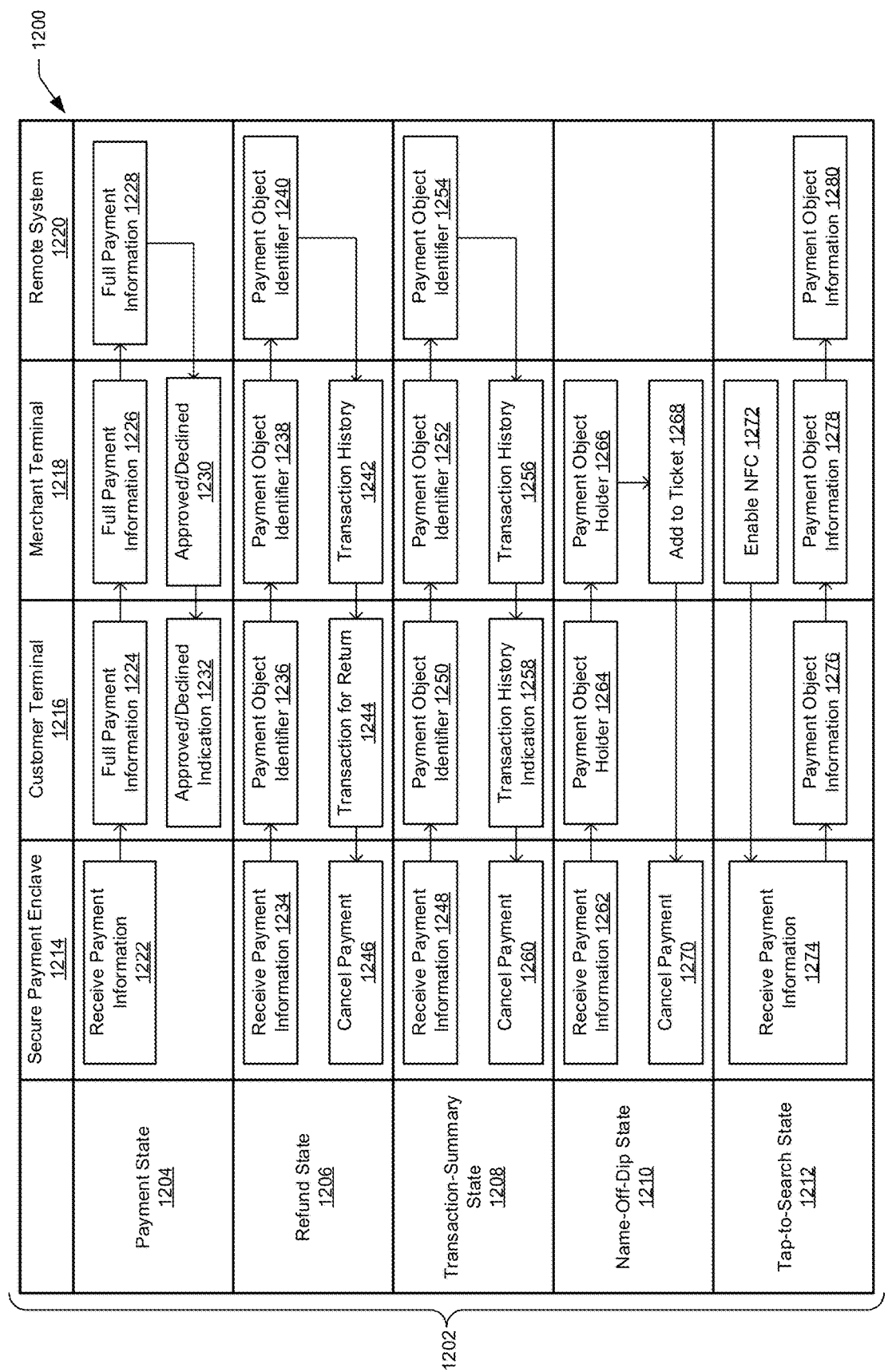
FIG. 12 depicts a non-limiting flow diagram illustrating message size optimization depending on a state of a POS system.

FIG. 12 depicts a non-limiting flow diagram 1200 illustrating message size optimization depending on a state of a POS system. The flow diagram 1200 depicts process flows that may be dependent on a state 1202 of the customer terminal and/or the merchant terminal. In the example shown in FIG. 12, the illustrated states 1202 include a payment state 1204, a refund state 1206, a transaction-summary state 1208, a name-off-dip state 1210, and a tap-to-search state 1212. However, it should be understood that these states are provided by way of illustration and these illustrated states are not the only potential states of the customer terminal and/or the merchant terminal. The payment state 1204 may correspond to a state where the POS system is engaged in or will be engaged in accepting a payment in exchange for, in examples, goods and/or services. The refund state 1206 may correspond to a state where the POS system is engaged in or will be engaged in issuing a refund to a customer. The transaction-summary state 1208 may correspond to a state where the POS system is engaged in or will be engaged in querying a local and/or remote system for transaction information associated with one or more transactions made using a particular payment object or made by a particular buyer, also described herein as a transaction-history state. The name-off-dip state 1210, also described herein as a name state, may correspond to a state where the POS system is engaged in receiving payment card information from a payment card via a NFC component of a payment-object reader of the customer terminal.

The flow of information, as shown in FIG. 12, passes from a secure payment enclave 1214 to or from other components of a customer terminal 1216 to or from a merchant terminal

1218 and/or to or from a remote system 1220. As described herein, the secure payment enclave 1214 may be associated with a payment-object reader, which may read payment object information by, for example, accepting a payment object that has been swiped into the payment-object reader, accepting a payment object that has been dipped into the payment-object reader, and/or accepting a payment object that has been tapped or brought into close proximity to a NFC component of the payment-object reader. In examples, the payment-object reader may be a component of the customer terminal 1216, and in these examples, the secure payment enclave 1214 may be a component of the customer terminal 1216. In other examples, the payment-object reader may be separate component from the customer terminal 1216. In these examples, the secure payment enclave 1214 may be stored on memory associated with the customer terminal 1216 and/or on memory associated with the separated payment-object reader.

With respect to message flow and sizing optimization when the customer terminal 1216 and/or the merchant terminal 1218 is in the payment state 1204, payment information may be received by the secure payment enclave 1214 at block 1222. The payment information may include, for example, a payment object identifier, such as a credit card number, debit card number, hash value, or other identifier of the payment object. The payment information may also include, for example, a name or naming indicator corresponding to a person authorized to use the payment object. The payment information may also include, for example, an expiration data associated with the payment object. The payment information may also include, for example, contact information associated with the payment object. The payment information may also include, for example, address information associated with the payment object. Obtaining one or more of the types of information described above may be based at least in part on a customer providing permission to obtain such information from the payment object.

At block 1224, the process may include sending, from the secure payment enclave 1214 to one or more other components of the customer terminal 1216 all or substantially all of the payment information obtained from the payment object. By so doing, in the payment state 1204, all of the payment object information needed and/or desired to complete a transaction may be sent from the secure payment enclave 1214 to the other components of the customer terminal 1216. At block 1226, the process may include sending all or substantially all of the payment information from the customer terminal 1216 to the merchant terminal 1218. At block 1228, the process may include sending all or substantially all of the payment information from the merchant terminal 1218 to a remote system 1220. As described herein, the remote system 1220 may include some or all of the remote system 130, the payment processing system 116, the financial institution system 124, and/or the card payment network 122 from FIG. 1.

In the payment state 1204, one or more instructions and/or data may be sent to the remote system 1220 to cause the remote system 1220 to process some or all of the payment information for the purpose of conducting a payment transaction between the merchant and a buyer. The remote system 1220 may perform one or more operations, as outlined above with respect to FIGS. 1 and 7, for example, to determine whether the payment object should be approved or declined to be used to pay for goods and/or services of the merchant. The remote system 1220 may send data to the merchant terminal 1218 indicating that the payment object is approved or declined at block 1230. An approval/declination indication may be sent from the merchant terminal 1218 to the customer terminal 1216 at block 1232. A visual representation of the approval/declination indication may be presented on a display of the customer terminal 1216 along with one or more options for the customer to select to finalize the payment transaction in the case of the payment object being approved or to select another method of payment in the case of the payment object being declined. In total, in the payment state 1204, the message sizing for the payment information may not be limited given that all or substantially all of the payment information is needed or desired to complete a transaction with the merchant.

With respect to message flow and sizing optimization when the customer terminal 1216 and/or the merchant terminal 1218 is in the refund state 1206, payment information may be received by the secure payment enclave 1214 at block 1234. The payment information may include the types of information described above with respect to block 1222. At block 1236, the process may include sending, from the secure payment enclave 1214 to one or more other components of the customer terminal 1216 a subset of the payment information obtained from the payment object. For example, the subset of the payment information may include the payment object identifier and may not include the other types of payment object information. Alternatively, the subset of the payment information may include the name or naming indicator and may not include other types of payment object information. By so doing, in the refund state 1206, message sizing for sending between the secure payment enclave 1214, the other components of the customer terminal 1216, the merchant terminal 1218, and/or the remote system 1220 may be optimized. Message sizing optimization results in less data being transmitted between the components of the POS system and from the POS system to the remote system, which increases processing speeds, reduces storage needs, and, as described more fully with respect to FIG. 13, allows for various forms of serialization depending on a confidentiality level associated with the payment information being sent.

Alternatively to the secure payment enclave 1214 performing the message sizing optimization, all or substantially all of the payment information obtained from the payment object may be sent from the secure payment enclave 1214 to the other components of the customer terminal 1216, and the customer terminal 1216 may perform the message sizing optimization before sending the subset of the payment object information to the merchant terminal 1218. Alternatively, all or substantially all of the payment object information may be sent from the customer terminal 1216 to the merchant terminal 1218, and the merchant terminal 1218 may perform the message sizing optimization before sending the subset of the payment object information to the remote system.

In the example where the secure payment enclave 1214 performs the message sizing optimization, as described above, at block 1236, the payment object identifier may be receive from the secure payment enclave 1214 and at the other components of the customer terminal 1216. At block 1238, the payment object identifier may be sent from the customer terminal 1216 to the merchant terminal 1218. At block 1240, the payment object identifier may be sent from the merchant terminal 1218 to the remote system 1220. In addition to the payment object identifier, one or more instructions may be sent to the remote system 1220, which may cause the remote system 1220 to perform one or more operations associated with providing a refund to the customer. As described herein, the remote system 1220 may include some or all of the remote system 130, the payment processing system 116, the financial institution system 124, and/or the card payment network 122 from FIG. 1.

By way of example, transaction history associated with the payment object may be identified and data corresponding to the transaction history may be sent from the remote system 1220 to the merchant terminal 1218 at block 1242. The transaction history may be utilized to search for a transaction associated with the goods to be returned for a refund, for example. In examples, the transaction history, a portion thereof, or related information may be sent from the merchant terminal 1218 to the customer terminal 1216 at block 1244, such as when the customer is to assist in the refund process by, for example, selecting the transaction associated with the goods to be returned, providing a signature for the return, selecting an option for return of funds, etc. Given that a payment is not being made, which is generally the action to be taken when a payment object is read by the payment-object reader, in examples, the customer terminal 1216 and/or the merchant terminal 1218 may, at block 1246, send a payment cancellation to the secure payment enclave 1214 and/or to the remote system 1220. The payment cancellation may result in the secure payment enclave 1214 being freed up to accept another payment object.

With respect to message flow and sizing optimization when the customer terminal 1216 and/or the merchant terminal 1218 is in the transaction-summary state 1208, payment information may be received by the secure payment enclave 1214 at block 1248. The payment information may include the types of information described above with respect to block 1222. At block 1250, the process may include sending, from the secure payment enclave 1214 to one or more other components of the customer terminal 1216 a subset of the payment information obtained from the payment object. For example, the subset of the payment information may include the payment object identifier and may not include the other types of payment object information. Alternatively, the subset of the payment information may include the name or naming indicator and may not include other types of payment object information. By so doing, in the transaction-summary state 1208, message sizing for sending between the secure payment enclave 1214, the other components of the customer terminal 1216, the merchant terminal 1218, and/or the remote system 1220 may be optimized. Message sizing optimization results in less data being transmitted between the components of the POS system and from the POS system to the remote system, which increases processing speeds, reduces storage needs, and, as described more fully with respect to FIG. 13, allows for various forms of serialization depending on a confidentiality level associated with the payment information being sent.

Alternatively to the secure payment enclave 1214 performing the message sizing optimization, all or substantially all of the payment information obtained from the payment object may be sent from the secure payment enclave 1214 to the other components of the customer terminal 1216, and the customer terminal 1216 may perform the message sizing optimization before sending the subset of the payment object information to the merchant terminal 1218. Alternatively, all or substantially all of the payment object information may be sent from the customer terminal 1216 to the merchant terminal 1218, and the merchant terminal 1218 may perform the message sizing optimization before sending the subset of the payment object information to the remote system.

In the example where the secure payment enclave 1214 performs the message sizing optimization, as described above, at block 1250, the payment object identifier may be received from the secure payment enclave 1214 and at the other components of the customer terminal 1216. At block 1252, the payment object identifier may be sent from the customer terminal 1216 to the merchant terminal 1218. At block 1254, the payment object identifier may be sent from the merchant terminal 1218 to the remote system 1220. In addition to the payment object identifier, one or more instructions may be sent to the remote system 1220, which may cause the remote system 1220 to perform one or more operations associated with searching for transaction histories or providing transaction summaries for transactions associated with the payment object. As described herein, the remote system 1220 may include some or all of the remote system 130, the payment processing system 116, the financial institution system 124, and/or the card payment network 122 from FIG. 1.

At block 1256, transaction history associated with the payment object may be identified and data corresponding to the transaction history may be sent from the remote system 1220 to the merchant terminal 1218. The transaction history may be utilized to view individual transactions associated with the payment object, one or more summaries of transactions associated with the payment object, or other information gathered or determined from transactions associated with the payment object. At block 1258, the transaction history, or an indication thereof, may be sent from the merchant terminal 1218 to the customer terminal 1216. Given that a payment is not being made, which is generally the action to be taken when a payment object is read by the payment-object reader, in examples, the customer terminal 1216 and/or the merchant terminal 1218 may, at block 1260, send a payment cancellation to the secure payment enclave 1214 and/or to the remote system 1220. The payment cancellation may result in the secure payment enclave 1214 being freed up to accept another payment object.

With respect to message flow and sizing optimization when the customer terminal 1216 and/or the merchant terminal 1218 is in the name-off-dip state 1210, payment information may be received by the secure payment enclave 1214 at block 1262. The payment information may include the types of information described above with respect to block 1222. At block 1264, the process may include sending, from the secure payment enclave 1214 to one or more other components of the customer terminal 1216 a subset of the payment information obtained from the payment object. For example, the subset of the payment information may include the name and/or naming indication, such as the payment object holder's name, associated with the payment object and may not include the other types of payment object information. By so doing, in the name-off-dip state 1208, message sizing for sending between the secure payment enclave 1214, the other components of the customer terminal 1216, the merchant terminal 1218, and/or the remote system 1220 may be optimized. Message sizing optimization results in less data being transmitted between the components of the POS system and from the POS system to the remote system, which increases processing speeds, reduces storage needs, and, as described more fully with respect to FIG. 13, allows for various forms of serialization depending on a confidentiality level associated with the payment information being sent.

As used herein "name-off-dip" may correspond to identifying and/or determining and/or selecting the name or a naming indicator of the person associated with the payment object. Doing so may be desired in situations where the name or naming indicator is to be used by the merchant, such as to be put on a ticket for a restaurant order. Additionally, it should be understood that while the name given to this state is "name-off-dip," the payment-object reader that reads the payment object may do so by one or more of receiving the payment object as "dipped" into the payment-object reader, receiving the payment object as "swiped" through a portion of the payment-object reader, and/or receiving the payment object as "tapped" or brought into close proximity to a NFC component of the payment-object reader, for example.

Alternatively to the secure payment enclave 1214 performing the message sizing optimization, all or substantially all of the payment information obtained from the payment object may be sent from the secure payment enclave 1214 to the other components of the customer terminal 1216, and the customer terminal 1216 may perform the message sizing optimization before sending the subset of the payment object information to the merchant terminal 1218. Alternatively, all or substantially all of the payment object information may be sent from the customer terminal 1216 to the merchant terminal 1218, and the merchant terminal 1218 may perform the message sizing optimization before sending the subset of the payment object information to the remote system.

In the example where the secure payment enclave 1214 performs the message sizing optimization, as described above, at block 1264, the name or naming indicator may be received from the secure payment enclave 1214 and at the other components of the customer terminal 1216. At block 1266, the payment object identifier may be sent from the customer terminal 1216 to the merchant terminal 1218. At block 1268, the name or naming indicator may be utilized in a manner requested by the merchant and/or the merchant terminal 1218, such as adding the name or naming indicator to a ticket.

Given that a payment is not being made, which is generally the action to be taken when a payment object is read by the payment-object reader, in examples, the customer terminal 1216 and/or the merchant terminal 1218 may, at block 1270, send a payment cancellation to the secure payment enclave 1214. The payment cancellation may result in the secure payment enclave 1214 being freed up to accept another payment object.

With respect to message flow and sizing optimization when the customer terminal 1216 and/or the merchant terminal 1218 is in the tap-to-search state 1212, at block 1272, the merchant terminal 1218 may enable a NFC component of the payment-object reader to accept a near-field communication from a payment object. Payment information may be received by the secure payment enclave 1214 at block 1274. The payment information may include the types of information described above with respect to block 1222. At block 1276, the process may include sending, from the secure payment enclave 1214 to one or more other components of the customer terminal 1216 a subset of the payment information obtained from the payment object. For example, the subset of the payment information may include the payment object identifier and may not include the other types of payment object information. Alternatively, the subset of the payment information may include the name or naming indicator and may not include other types of payment object information. By so doing, in the tap-to-search state 1212, message sizing for sending between the secure payment enclave 1214, the other components of the customer terminal 1216, the merchant terminal 1218, and/or the remote system 1220 may be optimized. Message sizing optimization results in less data being transmitted between the components of the POS system and from the POS system to the remote system, which increases processing speeds, reduces storage needs, and, as described more fully with respect to FIG. 13, allows for various forms of serialization depending on a confidentiality level associated with the payment information being sent.

Alternatively to the secure payment enclave 1214 performing the message sizing optimization, all or substantially all of the payment information obtained from the payment object may be sent from the secure payment enclave 1214 to the other components of the customer terminal 1216, and the customer terminal 1216 may perform the message sizing optimization before sending the subset of the payment object information to the merchant terminal 1218. Alternatively, all or substantially all of the payment object information may be sent from the customer terminal 1216 to the merchant terminal 1218, and the merchant terminal 1218 may perform the message sizing optimization before sending the subset of the payment object information to the remote system.

In the example where the secure payment enclave 1214 performs the message sizing optimization, as described above, at block 1276, the payment object identifier may be received from the secure payment enclave 1214 and at the other components of the customer terminal 1216. At block 1278, the payment object identifier may be sent from the customer terminal 1216 to the merchant terminal 1218. At block 1280, the payment object identifier may be sent from the merchant terminal 1218 to the remote system 1220. In addition to the payment object identifier, one or more instructions may be sent to the remote system 1220, which may cause the remote system 1220 to perform one or more operations associated with searching for transaction histories or providing transaction summaries for transaction associated with the payment object. As described herein, the remote system 1220 may include some or all of the remote system 130, the payment processing system 116, the financial institution system 124, and/or the card payment network 122 from FIG. 1. Transaction history may be sent from the remote system 1220 to the merchant terminal 1218 and/or the customer terminal 1216, such as described at blocks 1242 and/or 1244 with respect to the refund state 1208.

FIG. 13 depicts a non-limiting flow diagram 1300 illustrating message serialization optimization depending on a state of the POS system.

At block 1302, the process may include determining which application and/or device is sending information. For example, if a secure payment enclave is sending information, for example, to other components of a customer terminal, the process may continue to block 1304. If the customer terminal is sending information, for example, to a merchant terminal, the process may continue to block 1306.

At block 1304, where the secure payment enclave is sending information, a confidentiality level may be associated with the information being sent and/or a state that the customer terminal and/or the merchant terminal is in. As described above, the customer terminal and/or the merchant terminal may be in one of a variety of states. Some states may include a payment state, a refund state, a transaction-history state, a name-off-dip state, a tap-to-search state, and/or other states. Some or each of these states may correspond to a confidentiality level at which information passing between the components of a POS system is to be treated. The confidentiality levels may be measured or assigned using any number of metrics. By way of example, confidentiality levels of 1-3 may be employed, with each level corresponding to a different categorization of confidentiality. For example, a confidentiality level of 1 may correspond to information and/or a state that is nonconfidential, a confidentiality level of 2 may correspond to information and/or a state that is somewhat confidential, and a confidentiality level of 3 may correspond to information and/or a state that is highly confidential. The customer, the merchant, and/or an operator or system of the remote system may set the various confidentiality levels and the types of information or states that correspond to each confidentiality level.

By way of example, the name-off-dip state described with respect to FIG. 13 may be associated with the lowest level of confidentiality, the refund state and/or the transaction-history state and/or the tap-to-search state may be associated with a second level of confidentiality, and the payment state may be associated with a high level of confidentiality.

At block 1306, where the customer terminal is sending information to the merchant terminal, the confidentiality level associated with the information and/or the state may be determined. In examples, the confidentiality level may match the confidentiality level determined at block 1304. However, in other examples, the confidentiality level determined at block 1304 may not match the confidentiality level determined at block 1306. For example, given the payment-object reader and the other components of the customer terminal may be integral, even when the information sent between the secure payment enclave and the other components of the customer terminal are confidential, the nature of the communication makes nefarious access to the transmission difficult and therefore the confidentiality level may be less than a confidentiality level associated with the communication of the same information between the customer terminal and the merchant terminal.

Each confidentiality level may be associated with a protocol buffer for serialization of the information to be sent from the secure payment enclave to the other components of the customer terminal and/or the merchant terminal. As shown in FIG. 13, information sent from the secure payment enclave to other components of the customer terminal and having a low confidentiality level may be serialized using Protocol Buffer 1. Information sent from the secure payment enclave to other components of the customer terminal and having a mid confidentiality level may be serialized using Protocol Buffer 2. Information sent from the secure payment enclave to other components of the customer terminal and having a high confidentiality level may be serialized using Protocol Buffer 3. Information sent from the customer terminal to the merchant terminal and having a low confidentiality level may be serialized using Protocol Buffer 4. Information sent from the customer terminal to the merchant terminal and having a mid confidentiality level may be serialized using Protocol Buffer 5. Information sent from the customer terminal to the merchant terminal and having a high confidentiality level may be serialized using Protocol Buffer 6.

As used herein, protocol buffers refer to methods of serializing structured data, such as data to be sent via one or more wires between devices or components of devices. The methods include the use of an interface description language that may describe the data structure and one or more instructions that generate source code from the description of the data structure. By so doing, a stream of bytes may be generated or parsed that represent the structured data. The structured data to be utilized by the protocol buffers may be described as messages may be associated with a proto definition file and compiled with protoc. Messages may be serialized into a binary wire format, which may be forward compatible and/or backward compatible. The devices and/or components of devices that messages are sent to and/or from may include instructions, stored in memory, that authorizes communication between devices and/or device components via the protocol buffers described herein.

The various protocol buffers described herein and their relationships to the information being sent, device states, and/or confidentiality levels may differ with respect to, for example, annotation of declarations in the .proto file associated with each protocol buffer. The declaration annotation may, for example, be amended for code generation and parsing speech, code size, and runtime library usage. Protocol buffers associated with, for example, low confidentiality levels may have declaration annotations that increase the speed of compilation and/or parsing, have smaller code size, and use the "lite" runtime library. Protocol buffers associated with, for example, high confidentiality levels may have declaration annotations that reduce the speed of compilation and/or parsing, have larger code size, and use a full runtime library. Additionally, or alternatively, one or more custom options may be generated and/or utilized for declaration amendments to the .proto file. These options may be customized to generate serialized data that is more difficult to access for highly confidential information and/or high confidentiality levels.

While message communication has been described herein as being between a secure payment enclave and other components of a customer terminal and/or between a customer terminal and a merchant terminal, it should be understood that messages may be communicated between POS systems as well, or alternatively. Message sizing and serialization optimization may be performed for such communications between POS systems.

The foregoing is merely illustrative of the principles of this disclosure and various modifications may be made by those skilled in the art without departing from the scope of this disclosure. The above described examples are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A system comprising:
    a customer terminal comprising:
        a payment-object reader;
        one or more first processors; and
        first non-transitory computer-readable media storing a first operating-system and customer application collectively having instructions that, when executed by the one or more first processors, cause the one or more first processors to perform operations comprising:
            determining a state of at least one of the customer terminal or a merchant terminal, the state selected from at least a search state or a payment state;

receiving, via a secure payment enclave and from the payment-object reader, payment card information from a payment card; and sending, to the merchant terminal and based at least in part on the state, a subset of the payment card information, the subset of the payment card information being serialized based at least in part on a protocol buffer;

the merchant terminal comprising:

one or more second processors; and second non-transitory computer readable media storing a second operating-system and merchant application collectively having instructions that, when executed by the one or more second processors, cause the one or more second processors to perform operations comprising:

receiving, from the customer terminal, the subset of the payment card information, the subset of the payment card information being deserialized after the receiving;

sending the subset of the payment card information to a remote system; and receiving, from the remote system, transaction information associated with the payment card.

2. The system of claim 1, wherein the state corresponds to the search state, and the operations performed by the customer terminal further comprise:

identifying a payment card identifier from the payment card information; and generating message data including the subset of the payment card information, the subset including the payment card identifier, and wherein sending the subset of the payment card information comprises sending the message data to the merchant terminal.

3. The system of claim 1, wherein the state corresponds to the search state, and the operations performed by the customer terminal further comprise:

identifying a name or a name indicator of a person associated with the payment card from the payment card information; and generating message data including the subset of the payment card information, the subset including the name or the name indicator of the person, and wherein sending the subset of the payment card information comprises sending the message data to the merchant terminal.

4. The system of claim 1, wherein the protocol buffer comprises a first protocol buffer, and the operations performed by the customer terminal further comprise:

generating serialized payment card information from the payment card information received via the secure payment enclave, the generating based at least in part on a second protocol buffer; and sending, via the secure payment enclave to one or more other components of the customer terminal, at least a portion of the serialized payment card information.

5. A method comprising:

determining, at a customer terminal having a payment-object reader, a state of at least one of the customer terminal or a merchant terminal;

receiving, at the customer terminal, payment object information from a payment object;

sending, from the customer terminal to the merchant terminal and based at least in part on the state, a subset of the payment object information;

sending, from the merchant terminal to a remote system, the subset of the payment object information; and receiving, at the merchant terminal and from the remote system, transaction information associated with the payment object.

6. The method of claim 5, further comprising serializing the subset of the payment object information based at least in part on a protocol buffer, the protocol buffer determined based at least in part on the state.

7. The method of claim 5, wherein the state corresponds to a search state, and further comprising:

identifying a payment object identifier from the payment object information; and generating message data including the subset of the payment object information, the subset including the payment object information, and wherein sending the subset of the payment object information comprises sending the message data to the remote system.

8. The method of claim 5, wherein the state corresponds to a search state, and further comprising:

identifying a name or a name indicator of a person associated with the payment object from the payment object information; and generating message data including the subset of the payment object information, the subset including the name or the name indicator of the person, and wherein sending the subset of the payment object information comprises sending the message data to the remote system.

9. The method of claim 5, further comprising:

generating serialized payment object information from the payment object information received via a secure payment enclave, the generating based at least in part on a protocol buffer; and sending, via the secure payment enclave to one or more other components of the customer terminal, at least a portion of the serialized payment object information.

10. The method of claim 9, wherein the protocol buffer comprises a first protocol buffer, and further comprising:

reserializing the serialized payment object information based at least in part on a second protocol buffer to generate reserialized payment object information; and sending, from the customer terminal to the merchant terminal, at least a portion of the reserialized payment object information.

11. The method of claim 5, wherein:

the customer terminal includes a first operating-system stack;

the merchant terminal includes a second operating-system stack;

first non-transitory computer-readable media of the first operating-system stack causes one or more first processors of the customer terminal to:

receive the payment object information via a secure payment enclave; and send the subset of the payment object information to the merchant terminal; and second non-transitory computer-readable media of the second operating-system stack causes one or more second processors of the merchant terminal to:

receive the subset of the payment object information from the customer terminal; and send the subset of the payment object information to the remote system.

12. The method of claim 11, wherein:

the first operating-system stack includes at least one of a first instance of a state machine, a message sizing application, an accessibility application, or a protocol buffer; and the second operating-system stack includes at least one of a second instance of the state machine, the protocol buffer, the message sizing application, or a point-of-sale application.

13. A system comprising:
   a customer terminal comprising:
      one or more first processors; and
      first non-transitory computer-readable media storing instructions that, when executed by the one or more first processors, cause the one or more first processors to perform operations comprising:
         determining a state of at least one of the customer terminal or a merchant terminal;
         receiving payment object information from a payment object;
         serializing the payment object information based at least in part on a protocol buffer, the protocol buffer determined based at least in part on the state; and
         sending, to the merchant terminal, the payment object information;
   the merchant terminal comprising:
      one or more second processors; and
      second non-transitory computer readable media storing instructions that, when executed by the one or more second processors, cause the one or more second processors to perform operations comprising:
         receiving, from the customer terminal, the payment object information;
         sending the payment object information to a remote system; and
         receiving, from the remote system, transaction information associated with the payment object.

14. The system of claim 13, wherein the state corresponds to a search state, the protocol buffer is one of multiple protocol buffers, and the operations performed by the customer terminal further comprise:
   selecting the protocol buffer from the multiple protocol buffers based at least in part on the state corresponding to the search state;
   identifying a payment object identifier from the payment object information; and
   wherein serializing the payment object information comprises serializing the payment object identifier via the protocol buffer.

15. The system of claim 13, wherein the state corresponds to a search state, the protocol buffer is one of multiple protocol buffers, and the operations performed by the customer terminal further comprise:
   selecting the protocol buffer from the multiple protocol buffers based at least in part on the state corresponding to the search state;
   identifying a name or a name indicator of a person associated with the payment object from the payment object information; and
   wherein serializing the payment object information comprises serializing the name or the naming indicator via the protocol buffer.

16. The system of claim 13, wherein:
   the first non-transitory computer-readable media includes a first operating-system stack; and
   the second non-transitory computer-readable media includes a second operating-system stack.

17. The system of claim 16, wherein:
   the first operating-system stack includes at least one of a first instance of a state machine, a message sizing application, an accessibility application, or a protocol buffer; and
   the second operating-system stack includes at least one of a second instance of the state machine, the protocol buffer, the message sizing application, or a point-of-sale application.

18. The system of claim 13, wherein sending the payment object information to the merchant terminal comprises sending a subset of the payment object information to the merchant terminal based at least in part on the state.

19. The system of claim 13, the operations performed by the merchant terminal further comprise sending, to the customer terminal, an indication that the state corresponds to a tap-to-search state, the indication causing a near-field communication device associated with a secure payment enclave to activate, the payment object information obtained from the near-field communication device.

20. The system of claim 13, wherein the protocol buffer comprises a first protocol buffer, and the operations performed by the customer terminal further comprise:
   generating serialized payment object information from the payment object information received via a secure payment enclave, the generating based at least in part on a second protocol buffer; and
   sending, via the secure payment enclave to one or more other components of the customer terminal, at least a portion of the serialized payment object information.

* * * * *